US012741819B1

(12) United States Patent
Ravi et al.

(10) Patent No.: US 12,741,819 B1
(45) Date of Patent: Sep. 22, 2026

(54) MECHANISM(S) FOR DE-JAMMING PACKAGES WITHIN MATERIAL HANDLING EQUIPMENT (MHE)

(71) Applicant: Amazon Technologies, Inc., Seattle, WA (US)

(72) Inventors: Nivedita Ravi, Kirkland, WA (US); Fernando Ruch, West Palm Beach, FL (US); Moses Trevor Dardik, Andover, MA (US); Kenneth Meszaros, St. Pete, FL (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 18/598,771

(22) Filed: Mar. 7, 2024

(51) Int. Cl.

| | |
|---|---|
| ***B65G 11/20*** | (2006.01) |
| ***B65G 43/08*** | (2006.01) |
| *B65G 37/00* | (2006.01) |
| *B65G 45/00* | (2006.01) |

(52) U.S. Cl.
CPC ............ *B65G 11/203* (2013.01); *B65G 43/08* (2013.01); *B65G 37/00* (2013.01); *B65G 45/00* (2013.01); *B65G 2201/025* (2013.01)

(58) Field of Classification Search
CPC ...... B65G 11/00–206; B65G 37/00–02; B65G 43/08; B65G 47/12–1492; B65G 47/22–32; B65G 47/44; B65G 47/88–8892; B65G 2201/025; B65G 2812/08
USPC .... 193/2 R–2 E; 198/339.1–346.3, 348–417, 198/434–462.3, 523–569, 717–777
See application file for complete search history.

(56) References Cited

U.S. PATENT DOCUMENTS

| | | | | | |
|---|---|---|---|---|---|
| 2,404,882 | A * | 7/1946 | Monaco | B65G 47/52 | 198/462.3 |
| 3,934,707 | A * | 1/1976 | Bowman | B65G 47/268 | 198/460.1 |
| 4,399,907 | A * | 8/1983 | Wiknich | B65G 25/10 | 198/718 |
| 5,222,586 | A * | 6/1993 | Ydoate | B65G 47/32 | 198/452 |
| 5,373,930 | A * | 12/1994 | Tsuzuki | B65H 67/064 | 198/399 |
| 5,419,425 | A * | 5/1995 | Goater | B65G 47/8823 | 198/463.4 |
| 5,890,579 | A * | 4/1999 | Young | B65G 47/29 | 198/459.7 |
| 6,131,723 | A * | 10/2000 | Schroader | B65G 47/256 | 198/452 |
| 6,575,286 | B1 * | 6/2003 | Mills | B65G 47/261 | 193/35 G |
| 7,032,741 | B1 * | 4/2006 | Fortenbery | B65G 11/203 | 198/530 |

(Continued)

*Primary Examiner* — Joseph A Dillon, Jr.
(74) *Attorney, Agent, or Firm* — Athorus, PLLC

(57) ABSTRACT

A system including a one or more de-jamming mechanisms having a wedge configured to move from a retracted state to an extended state in which the wedge is at least partially disposed within a material handling equipment (MHE) in which packages are processed. The system receives data associated with the packages in the MHE, and causes, at a first instance in time, the wedge to move from the retracted state to the extended state, and causes, at a second instance in time, the wedge to move from the extended state to the retracted state.

20 Claims, 18 Drawing Sheets

(56) References Cited

U.S. PATENT DOCUMENTS

| | | | | |
|---|---|---|---|---|
| 7,232,025 | B1 * | 6/2007 | Warren | B65G 47/8823<br>193/35 A |
| 8,342,313 | B2 * | 1/2013 | Wargo | B65G 47/29<br>198/419.1 |
| 9,132,971 | B2 * | 9/2015 | Overly | B65B 35/50 |
| 9,745,144 | B2 * | 8/2017 | Magnusson | B65G 47/766 |
| 10,246,271 | B2 * | 4/2019 | Heger | B65G 47/8823 |
| 10,961,055 | B2 * | 3/2021 | Best | B65G 47/44 |
| 11,001,453 | B2 * | 5/2021 | Hironaka | B65G 47/8815 |
| 11,254,506 | B1 * | 2/2022 | Robin | B07C 3/18 |
| 11,401,116 | B1 * | 8/2022 | Covelle | B65G 47/8823 |
| 11,697,560 | B2 * | 7/2023 | Schroader | B65G 47/68<br>198/434 |
| 11,708,223 | B2 * | 7/2023 | Gharz | B65G 47/96<br>198/456 |
| 11,878,877 | B2 * | 1/2024 | Zhang | B65G 13/07 |
| 12,151,895 | B1 * | 11/2024 | McGrath | B65G 11/083 |
| 12,479,669 | B2 * | 11/2025 | Narutaki | B65G 47/8815 |
| 2004/0084282 | A1 * | 5/2004 | Hellmann | B65B 35/58<br>198/395 |
| 2007/0023257 | A1 * | 2/2007 | Schiesser | B65G 47/66<br>198/539 |
| 2008/0121498 | A1 * | 5/2008 | Costanzo | B65G 17/24<br>198/779 |
| 2016/0244267 | A1 * | 8/2016 | Rendell | B65G 15/14 |
| 2022/0324658 | A1 * | 10/2022 | Cedarleaf-Pavy | B65G 47/44 |
| 2023/0242353 | A1 * | 8/2023 | Tondreau, III | B65G 47/68<br>198/459.6 |
| 2023/0399180 | A1 * | 12/2023 | Diesner | B65G 47/261 |
| 2025/0250126 | A1 * | 8/2025 | Senninger | B65G 47/44 |

* cited by examiner 600
102
112
622
618
610
614
608
628
626
620
604
606
616
118
636(1)
632
FIRST DIRECTION 402
636(2)
630
636(3)
624
SECOND DIRECTION 404
612
602

600
102
112
622
618
610
614
628
626
620
608
616
118
636(1)
606
604
632
FIRST DIRECTION 402
SECOND DIRECTION 404
636(3)
634
630
624
612
602

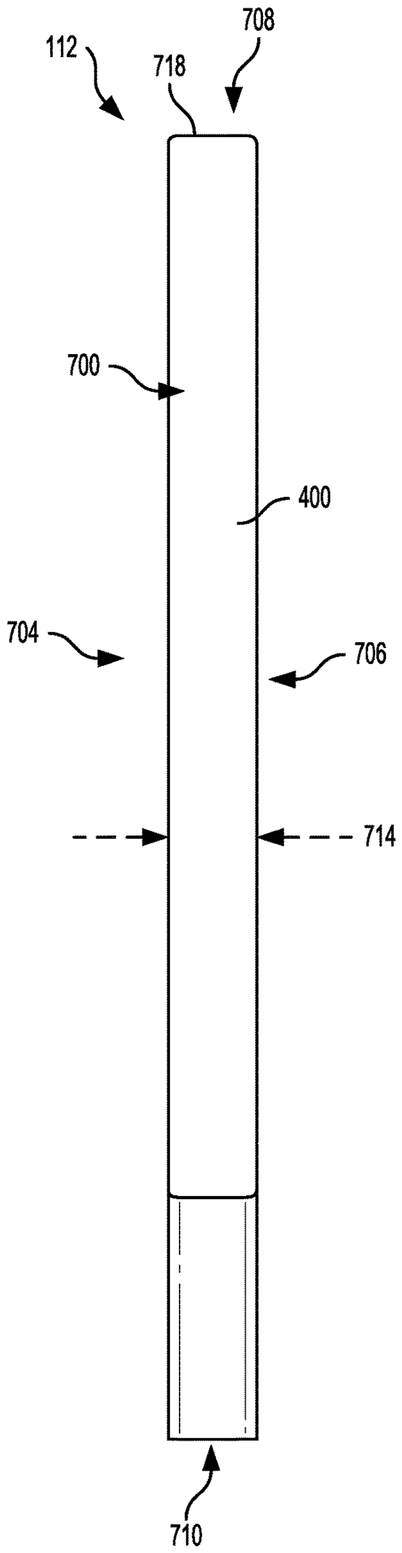
FIG. 7B
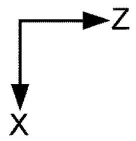

MECHANISM(S) FOR DE-JAMMING PACKAGES WITHIN MATERIAL HANDLING EQUIPMENT (MHE)

BACKGROUND

Modern environments, such as warehouses, distribution centers, airports, and manufacturing facilities, include material handling equipment (MHEs), such as chutes, that may be used to transfer items. In some examples, the chutes may be disposed between conveyors, from conveyors to collection bins (e.g., gaylords), and the like. Along the chutes, such as around a bend of the chute or at an intersection between a chute and a conveyor, the items may become clogged, bunched, jammed, and the like. Similar jams may occur along other types of MHEs, such as conveyors, funnels, slides, etc. Unfortunately, these jams may lead to decreased throughput, often require manual intervention to clear, and back up the item(s) within the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIGS. 7A and 7B illustrate an example wedge of the de-jamming mechanism(s) of FIG. 1, according to examples of the present disclosure.

DETAILED DESCRIPTION

Figure 1:
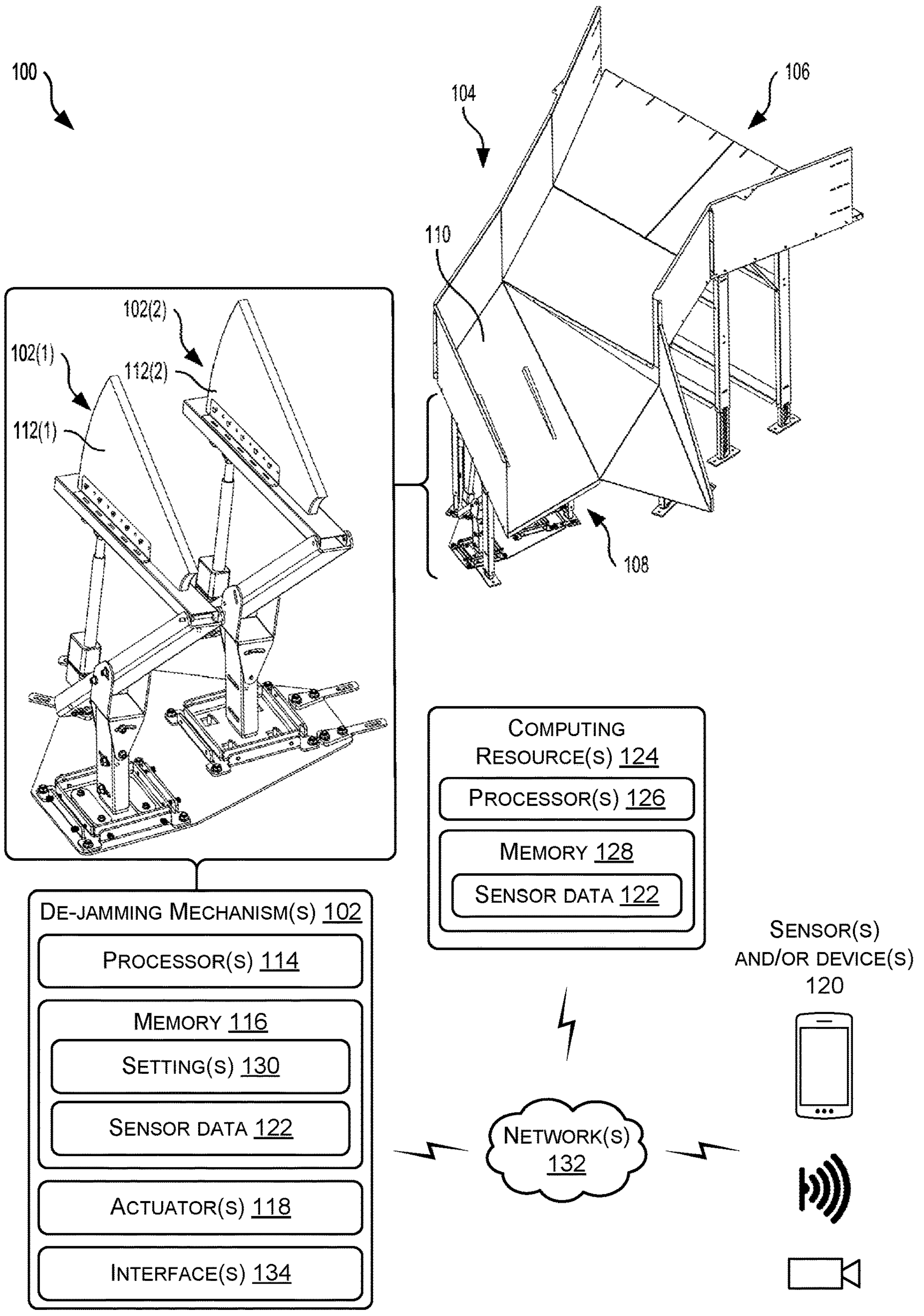
FIG. 1 illustrates de-jamming mechanism(s) that prevent packages becoming jammed along a material handling equipment (MHE), according to examples of the present disclosure.
Figure 2A:
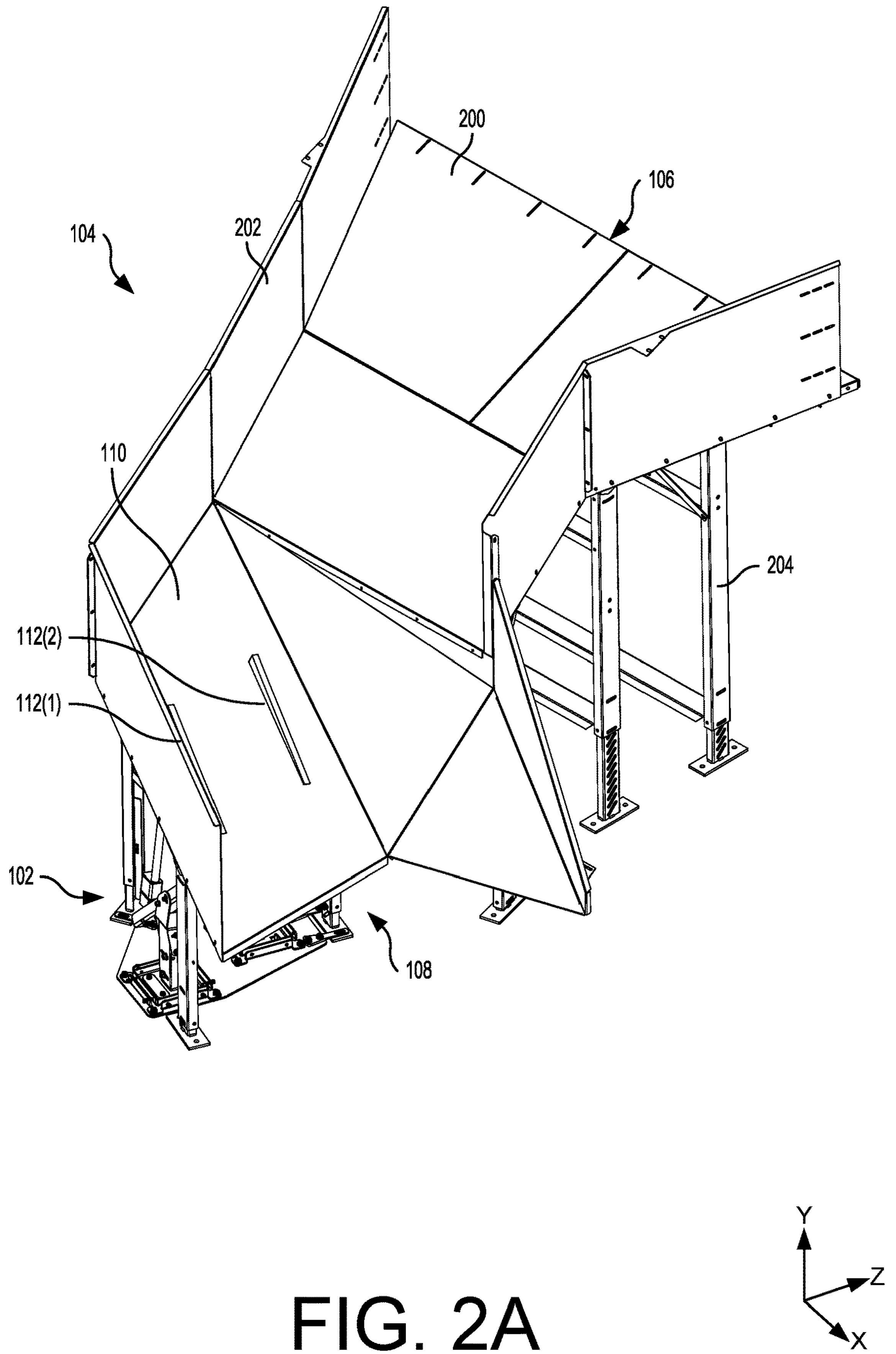
FIGS. 2A-2D illustrate various views of the MHE with the de-jamming mechanism(s) of FIG. 1, according to examples of the present disclosure.
Figure 2B:
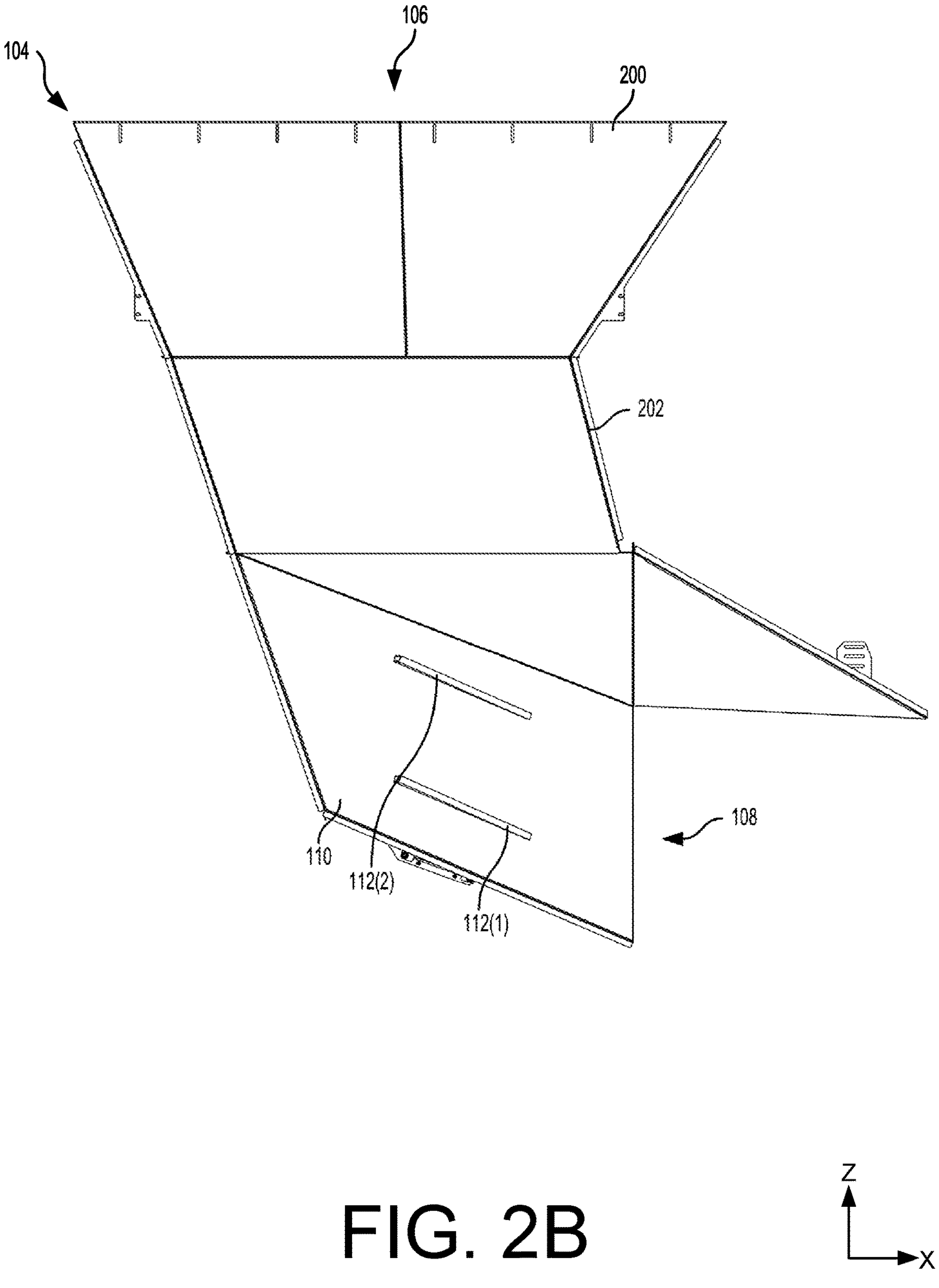
Figure 2C:
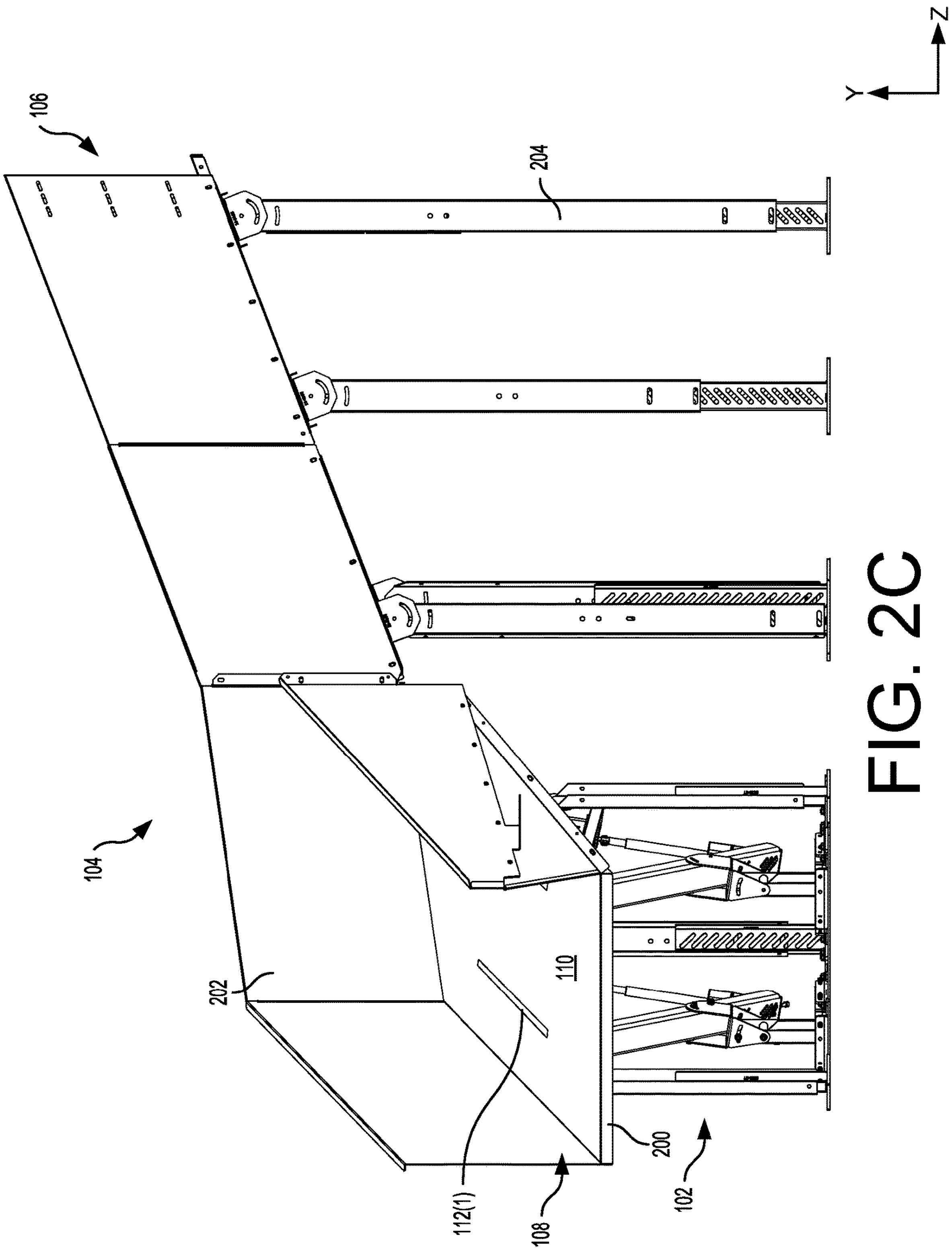
Figure 2D:
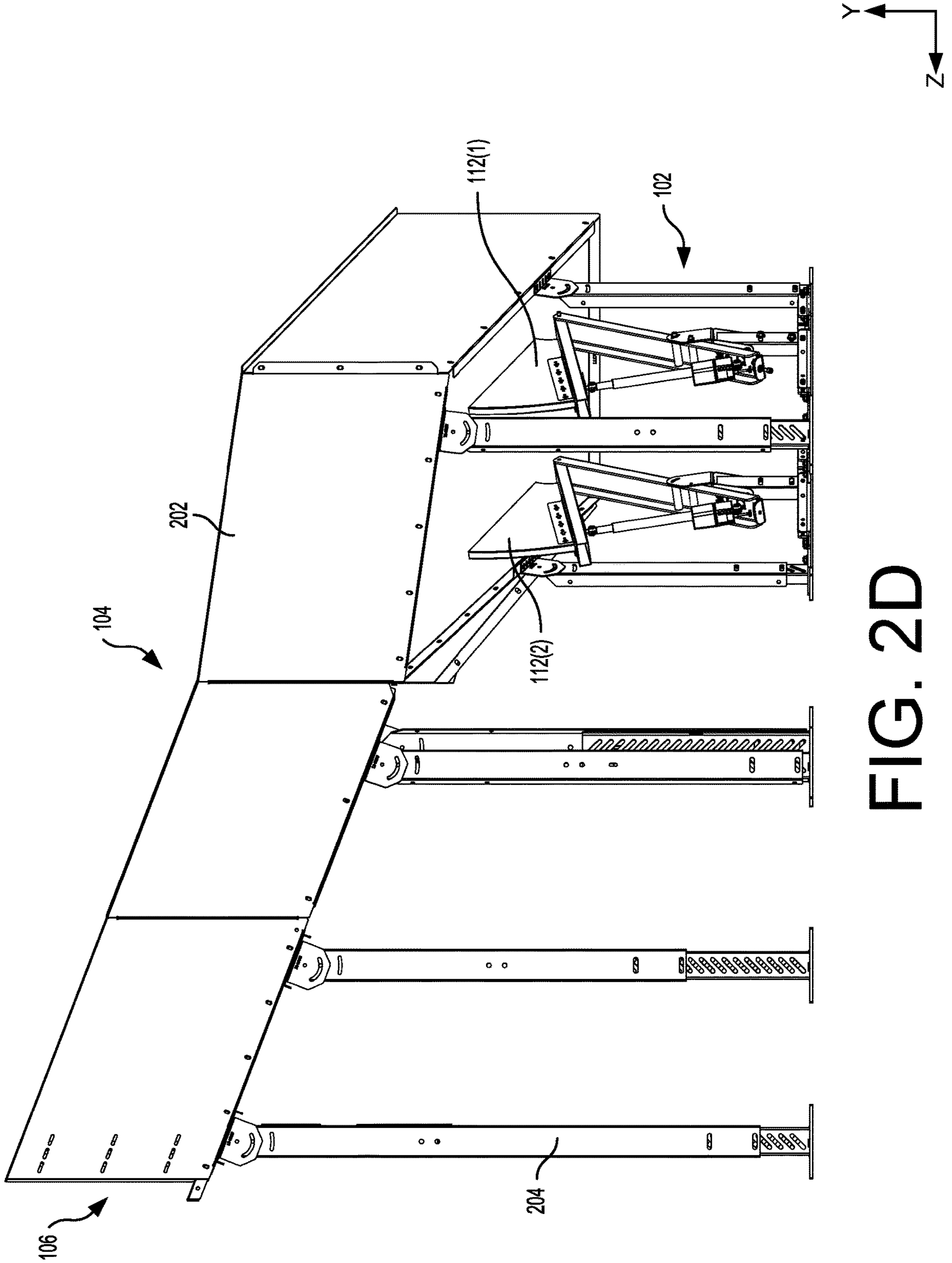

This application is directed, at least in part, to de-jamming mechanism(s) (e.g., device, system, assembly, etc.) that may prevent packages clogging, backing up, or otherwise jamming within material handling equipment (MHE)s, according to examples of the present disclosure. In some instances, the de-jamming mechanism(s) may include one or more wedge(s) that extend into the MHE in an attempt to clear and/or prevent the packages jamming, or becoming jammed, within the MHE. In some instances, one or more sensor(s) may monitor the MHE, and when the packages become jammed, the de-jamming mechanism(s) may be caused to actuate. As the de-jamming mechanism(s) actuate, the wedge(s) may interact with the packages in order to clear any jams. For example, the wedge(s) may push, move, engage, etc. the packages in an attempt to clear the jam. As such, the de-jamming mechanism(s) may be used clear jams to increase package throughput, efficiencies, and the like.

In some instances, the MHE may be located within an environment in which the packages are sorted for shipment, induction, storage, etc. In some instances, the MHE may represent a system that moves materials or goods throughout an environment. As non-limiting examples, a MHE may include chutes, funnels, slides, motorized conveyors, and rollers, or other transfer mechanisms that transports a physical entity between Industrial Automated Equipment (IAE) or manual processing points. In some instances, the MHE may be disposed between one or more conveyors, from a conveyor to a container (e.g., gaylord), between MHEs, and so forth. For example, within the environment, packages may be sorted from a first conveyor to a second conveyor via the MHE. One or more arms may be actuated to cause the package to be diverted from the first conveyor and onto the MHE. The packages may slide down the MHE and onto the second conveyor. From the second conveyor, the packages may further traverse about the environment, may be bundled together for shipment (e.g., to a like destination), may be sorted, and so forth. Between the first conveyor and the second conveyor, the MHE may include bends, loops curves, spirals, etc., for example, to direct the packages to the second conveyor. The environment may include any number of conveyors, MHEs and/or other transfer mechanisms (e.g., slides, rollers, etc.) to process the packages. The MHE may be made from any number of sheets, plates, panels, sections, and so forth.

The wedge(s) of the de-jamming mechanism(s) may penetrate (e.g., extend, enter, etc.) into the MHE to prevent jams, or in instances where jams are detected, to clear the jam. Although described as a wedge that penetrates into the MHE, the wedge may represent a panel, body, plate, sheet, members, piston, etc. that extends into the MHE. The wedge may be any size, configuration, shape, etc. The MHE may have one or more slots (e.g., channels, passageways, openings, etc.) into the which the wedge(s) are at least partially disposed. The wedge(s) may be raised out of the slot, and back into the slot, during actuation of the de-jamming mechanism(s). A tolerance between the slots and the wedge(s) may be minimal (e.g., +/−5 mm) to prevent the packages (or a material thereof) catching at an interface between the slots and the wedge(s) in order to avoid packages becoming stuck along the MHE. The de-jamming mechanism(s) may have a resting state where a surface of the wedge(s) is flush with a surface of the MHE. In doing so, the MHE and the wedge may form a flat surface on which the packages may slide to avoid the packages snagging, catching, etc. on the surface of the wedge.

Unfortunately, from time to time, the packages may become jammed within the MHE. For example, around a bend of the MHE, or at an intersection between the MHE and a conveyor (e.g., the second conveyor), the packages may become stuck. Failing to release or clear the packages may result in a jam along the MHE and prevent the packages being properly diverted between conveyors. Once a jam is detected, for example, actuators of the de-jamming mechanism(s) may cause the wedge(s) to actuate. When actuated, the wedge(s) may extend into the MHE in an attempt to clear (e.g., dislodge) the packages. In some instances, the actuator(s) may extend and retract the wedge(s) into and out of the MHE (e.g., via the slots). For example, the actuator(s) may extend in a first direction to move the wedge(s) into the MHE, and may retract in a second direction (opposite the first direction) to move the wedge(s) out of the MHE. Stated alternatively, the actuator(s) may move the wedge(s) from a first position in which the surface of the wedge(s) is flush with the surface of the MHE, and a second position in which the surface of the wedge(s) is disposed above the surface of the MHE. The movement of the wedge(s) back to the first position, for example, may allow the packages to slide over a top of the wedge(s) (e.g., over the top surface of the wedge(s)) in order to prevent further jamming in the MHE. In some instances, the wedge(s) may cycle back and forth (e.g., in an oscillating movement) in the different directions, between the different positions, and so forth. Any number of cyclical movements of the wedge(s) in the different directions and/or between the different positions may take place.

In some instances, the de-jamming mechanism(s) may include a first de-jamming mechanism and a second de-jamming mechanism. However, any number of de-jamming mechanism(s) may be included and the de-jamming mechanism(s) may be disposed along a length of the MHE, at different or similar locations. In instances where two of the de-jamming mechanism(s) are included, in some instances, the wedge(s) of the de-jamming mechanism(s) may be in synchronous or asynchronous movement. When the wedge(s) are in synchronous movement, the wedge(s) may be moved to the same position, in the same direction, etc. When the wedge(s) are in asynchronous movement, the wedge(s) may be moved to different positions, in different direction(s), etc. For example, when a first wedge of a first de-jamming mechanism is extending in a direction into the MHE, a second wedge of a second de-jamming mechanism may be retracting in a direction from the MHE.

The asynchronous movement may prevent both the first wedge and the second wedge blocking a flow of packages through the MHE. For example, when the first wedge is retracted, packages may be permitted to slide along, over, down, etc. a portion of the MHE where the first wedge is disposed, while when the second wedge is extended, the packages may be restricted from sliding along, over, down, etc. a portion of the MHE where the second wedge is disposed. In some instances, the asynchronous movement may be caused by actuating the first wedge at a first instance in time and then actuating the second wedge at a second instance in time that is after the first instance in time. For example, the first wedge may be extended into the MHE at the first instance in time, and when the first wedge reaches a limit (e.g., distance into the MHE), at a second instance in time, the second wedge may be actuated. In some instances, at the second instance in time, the first wedge may be retracted. However, in some instances, only one of the wedge(s) may be actuated, for example, depending upon the location of the jam within the MHE. In some instances, the de-jamming mechanism(s) may be individually, or collectively, controlled.

In some instances, the de-jamming mechanism(s) may be actuated based at least in part on sensor(s) detecting a jam. For example, the sensor(s) may be disposed along, above, etc. the MHE to monitor whether the packages become jammed, whether the packages are flowing through the MHE, whether a certain number of packages reside in the MHE, and so forth. Sensor data generated by the sensor(s), for example, may be analyzed to determine whether a jam is present. In some instances, the sensor(s) may include photoelectric sensor(s), LIDAR, cameras, etc. that detect when packages have become jammed. For example, a photoelectric sensor(s) may generate a light curtain, and when the light curtain is obstructed, the packages may be jammed in the MHE. As another example, sensor(s) may be used to monitor whether the packages are backed up within the MHE and cross certain thresholds, boundaries, etc. For example, when the packages are backed up to a certain location within the MHE, a jam may be present. In some instances, the sensor(s) may be a component of the MHE (e.g., coupled thereto), a component of the de-jamming mechanism(s), or may be separate device(s), sensor(s), etc. In response to detecting a jam, the actuator(s) of the de-jamming mechanism(s) may be actuated to move the wedge(s).

Although described as being actuated in the event of a jam, in some instances, the de-jamming mechanism(s) may be actuated to proactively prevent jams. For example, even if no jams are detected in the MHE, the de-jamming mechanism(s) may be actuated according to certain schedules (e.g., once every ten minutes), when a certain amount of packages have been diverted to the MHE (e.g., one hundred), and so forth. In some instances, the de-jamming mechanism(s) may be remotely operated, for example, via a device of an associate working in the environment, or via computing resource(s) disposed within or remote from the environment. For example, the computing resource(s) may monitor the environment for causing the de-jamming mechanism to operate, the conveyors to operate, and so forth. Still, in some instances, a button may be located along the MHE and/or at the de-jamming mechanism to manually operate the de-jamming mechanism(s) or cause the de-jamming mechanism(s) to operate.

In some instances, when a jam is detected, indication(s) (e.g., audible, visual, etc.) such as alarms, alerts, etc. may be output for notifying associates. For example, in some instances, lighting elements, speakers, etc. may output a visual indication, audible indication, etc. The indication may be associated with requesting assistance from an associate within an environment to manually clear the environment. For example, an associate may manually manipulate the packages to clear the jam. In some instances, the notification may output at the MHE and/or the notification may be output on a device of the associate. The notification may be output upon determining whether the de-jamming mechanism(s) have been actuated for a threshold number of attempts without successfully clearing the jam. For example, if after a threshold number of attempts, the jam is still present, the de-jamming mechanism(s) are unable to clear the jam, other measures may be taken. In some instances, rather than determining whether the de-jamming mechanism(s) have been actuated a threshold number of attempts, if the de-jamming mechanism(s) have been actuated for a threshold period of time without clearing the jam, the notification may be output.

The de-jamming mechanism(s) may be controlled to operate according to certain setting(s), such as speeds, extension lengths, and so forth. For example, a speed may control how fast, or slow, wedge(s) acuate to extend into and retract from the MHE. The extension lengths, for example, may control how far into the MHEs the wedge(s) extend. The setting(s) may be dynamically set according to specific(s) of the environment, the MHE, a weight of the packages transported through the MHE, a traffic volume through the MHE, and so forth.

In some instances, the de-jamming mechanism(s) may be made up of any number of arms, legs, bars, strut(s), etc. For example, the de-jamming mechanism(s) may include a first arm and a second arm hingedly coupled together. The wedge may be coupled to the first arm and the actuator may be disposed between the first arm and the second arm. During actuation of the actuator, the first arm and the second arm may hingedly couple together (e.g., about a hinged) to extend the wedge into the MHE and retract the wedge from the MHE. In some instances, the wedge(s) may rotate into and out of the MHE. Moreover, a leg may be coupled to the second arm, and the leg may couple to a base that secures the de-jamming mechanism(s) to a ground, floor, etc. within the environment. However, in some instances, the de-jamming mechanism(s) (e.g., the leg, arms, etc.) may be coupled to the MHE (e.g., a frame, legs, etc.).

The de-jamming mechanism(s) may also include one or more adjustment mechanism(s) that adjust a yaw, pitch, and/or roll of the legs, the arms, and/or the wedge(s). For example, depending upon specifics of the environment and/or the MHE, the yaw, pitch, and/or roll may be adjusted. In some instances, the adjustment mechanism(s) may be adjusted such that the wedge(s) extend into the MHE perpendicular to the surface of the MHE on which the packages slide. The adjustment mechanism(s) may include fasteners, cranks, levers, keyed slots, etc. In some instances, the adjustment mechanism(s) may be disposed between an interface of the arms and the leg, the leg and the base, and so forth.

The MHE may be made of any suitable material, such as steel, aluminum, plastic, components, etc. The de-jamming mechanism(s), such as the legs, arms, etc., may be made from any suitable material, such as steel or aluminum. In some instances, the wedge(s) may be made of a different material than the MHE, such as plastics (e.g., high-density polyethylene) to reduce friction between the wedge(s) and the MHE.

Although described herein as being used within MHEs, and/or that the MHEs are used to convey packages, the de-jamming mechanism(s) may be used in other environments and/or the MHEs may be used for other purposes. For example, the MHEs may be used to convey luggage, and the de-jamming mechanism(s) may be used to prevent luggage being jammed in the MHE. More generally, the de-jamming mechanism(s) may be used to prevent item(s) (e.g., packages, luggage, etc.) becoming jammed. Additionally, the de-jamming mechanism(s) may be disposed along equipment, devices, objects, etc. other than MHEMHEs. Moreover, although the de-jamming mechanism(s) are described as being at a certain location along the MHE, the de-jamming mechanism(s) may be mounted within, along, etc. sidewalls perpendicular to a MHE so as not to interfere with a movement of packages while de-jamming takes place, or at the intersection of two conveyors where geometric angles or curvatures may result in material back-ups.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment, including a system 100 having de-jamming mechanism(s) 102 are used to prevent packages becoming jammed in a MHE 104, such as a chute, according to examples of the present disclosure. In some instances, the environment may represent any suitable environment in which the packages are processed for shipment, distribution, etc. Within the environment, the MHE 104 may be used to divert, transport, etc. the packages from one location to another, between conveyors, and so forth. For example, the MHE 104 may include an inlet 106 and an outlet 108 spaced apart from the inlet 106. Packages may enter the MHE 104 at the inlet 106 and slide down to the outlet 108.

As will be discussed herein, in some instances, the MHE 104 may be disposed between a first conveyor and a second conveyor. The MHE 104 may serve to transfer the packages from the first conveyor to the second conveyor. The packages may enter the MHE 104, at the inlet 106, from first conveyor, and may exit the MHE 104, at the outlet 108, onto the second conveyor. Between the inlet 106 and the outlet 108, the packages may slide along a surface 110 of the MHE 104 (e.g., bottom surface, sliding surface, etc.). The MHE 104 may include bends, curves, spirals, etc. between the inlet 106 and the outlet 108, and any number of sections, panels, etc. may form a length of the MHE 104. Sidewalls may also prevent the packages spilling out of the MHE 104.

The de-jamming mechanism(s) 102 may represent a device, assembly, system, etc. As shown, the de-jamming mechanism(s) 102 may be disposed along the MHE 104, between the inlet 106 and the outlet 108. In some instances, the de-jamming mechanism(s) 102 may be disposed beneath the MHE 104, but may actuate into the MHE 104 (e.g., through the surface 110) to clear and/or prevent any jams. For example, from time to time, the packages may become stuck, clogged, backed up, etc. within the MHE 104. Failing to clear these packages, or the jams, may result in the packages becoming backed up onto the first conveyor, which may lead to decreased throughput, damage to the packages and/or equipment in the environment, and so forth. When the jams are detected, and as will be explained herein, wedge(s) 112 of the de-jamming mechanism(s) 102 may be actuated to extend into the MHE 104 (e.g., up from the surface 110). As the wedge(s) extend into the MHE 104, the wedge(s) 112 may push, engage, etc. the packages in an attempt to clear the jam. In doing so, the packages may flow freely through the MHE 104. The wedge(s) 112 may also retract (e.g., towards the surface 110) to avoid acting as a barrier that prevents the packages flowing through the MHE 104. Although described as a wedge, the wedge(s) 112 may represent any suitable panel, sheet, member, body, etc.

In some instances, any number of de-jamming mechanism(s) 102 may be disposed along the MHE 104. For example, in FIG. 1, two of the de-jamming mechanism(s) 102 are shown, such as a first de-jamming mechanism 102(1) having a first wedge 112(1) and a second de-jamming mechanism 102(2) having a second wedge 112(2). Here, a system of de-jamming mechanism(s) 102 may be associated with the MHE 104 to clear jams. However, more than or less than two of the de-jamming mechanism(s) 102 may be included. Additionally, as shown, the first de-jamming mechanism 102(1) and the second de-jamming mechanism 102(2) may be located side-by-side, closer to the outlet 108 than the inlet 106. However, the de-jamming mechanism(s) 102 may be spaced apart from one another, located along different portions of the MHE 104, located along/at the same portion of the MHE 104, and so forth. Still, although the de-jamming mechanism(s) 102 are shown as being located beneath the MHE 104, and the wedge(s) extending into the MHE 104 from a bottom, for example, the wedge(s) 112 may extend into the MHE 104 from sides of the MHE 104, along a top of the MHE 104, and so forth.

The de-jamming mechanism(s) 102 may include processor(s) 114 and memory 116, where the processor(s) 114 may perform various functions and operations associated with controlling the de-jamming mechanism(s) 102 to reduce and/or prevent jams in the MHEs 104, and the memory 116 may store instructions executable by the processor(s) 114 to perform the operations described herein. For example, the de-jamming mechanism(s) 102 may include actuator(s) 118 that actuate the wedge(s) 112 to prevent and/or clear the jams within the MHE 104. In some instances, the actuator(s) 118 may extend and retract the wedge(s) 112 into and out of the MHE 104. For example, the actuator(s) 118 may extend in a first direction to move the wedge(s) 112 into the MHE 104, and may retract in a second direction (opposite the first direction) to move the wedge(s) 112 out of the MHE 104. Stated alternatively, the actuator(s) 118 may move the wedge(s) 112 from a first position in which the surface of the wedge(s) 112 is flush with the surface 110 of the MHE 104, and a second position in which the surface of the wedge(s) 112 is disposed above the surface 110 of the MHE 104. The movement of the wedge(s) 112 back to the first position, for example, may allow the packages to slide over a top of the wedge(s) 112 (e.g., over the top surface of the wedge(s) 112) in order to prevent further jamming in the MHE 104. In some instances, the wedge(s) 112 may cycle back and forth (e.g., in an oscillating movement) in the different directions, between the different positions, and so forth. Any number of cyclical movements of the wedge(s) 112 in the different directions and/or between the different positions may take place. In some instances, the actuator(s) 118 may translate to rotate the wedge(s) 112 into and from the MHE 104.

In instances where two of the de-jamming mechanism(s) 102 are included, in some instances, the wedge(s) 112 of the de-jamming mechanism(s) 102 may be in synchronous or asynchronous movement. When the wedge(s) 112 are in synchronous movement, the wedge(s) 112 may be moved to the same position, in the same direction, etc. When the wedge(s) 112 are in asynchronous movement, the wedge(s) 112 may be moved to different positions, in different direction(s), etc. For example, when the first wedge 112(1) of the first de-jamming mechanism 102(1) retracted from the MHE 104, the second wedge 112(2) of the second de-jamming mechanism 102(2) may be extending into the MHE 104. This asynchronous movement may prevent both the first wedge 112(1) and the second wedge 112(2) blocking a flow of packages through the MHE 104. For example, when the first wedge 112(1) is retracted, packages may be permitted to slide along, over, down, etc. a portion of the MHE 104 where the first wedge 112(1) is disposed, while when the second wedge 112(2) is extended, the packages may be restricted from sliding along, over, down, etc. a portion of the MHE 104 where the second wedge 112(2) is disposed. In some instances, the asynchronous movement may be caused by actuating the wedge(s) 112 at different times. For example, the first wedge 112(1) may be actuated at a first instance in time and the second wedge 112(2) may be extended at a second instance in time that is after the first instance in time. That is, the first wedge 112(1) may be extending into the MHE 104 at the first instance in time, and when the first wedge 112(1) is retracting, the second wedge 112(2) may be actuated to extend into the MHE 104. The first wedge 112(1) may be extended into the MHE 104 at the first instance in time, and when the first wedge 112(1) reaches a limit (e.g., distance into the MHE 104), at a second instance in time, the second wedge 112(2) may be actuated. In some instances, at the second instance in time, the first wedge 112(1) may be retracted.

However, in some instances, only one of the wedge(s) 112 may be actuated, for example, depending upon the location of the jam within the MHE. Moreover, in some instances, a single actuator may actuate the wedge(s) 112. For example, a single actuator may be coupled to the first wedge 112(1) and the second wedge 112(2), and actuating the actuator may move both the first wedge 112(1) and the second wedge 112(2).

In some instances, the de-jamming mechanism(s) 102 may be actuated based at least in part on sensor(s) and/or device(s) 120 detecting a jam. For example, the sensor(s) and/or device(s) 120 may be disposed along, above, etc. the MHE 104 to monitor whether the packages have become jammed, whether the packages are flowing through the MHE 104, whether a certain number of packages reside in the MHE 104, and so forth. Sensor data 122 generated by the sensor(s) and/or device(s) 120, for example, may be analyzed to determine whether a jam is present. In some instances, the sensor(s) and/or device(s) 120 may include photoelectric sensor(s), LIDAR, cameras, etc. that detect when packages have become jammed. For example, a photoelectric sensor(s) may generate a light curtain, and when the light curtain is obstructed, the packages may be jammed in the MHE 104. As another example, the sensor(s) and/or device(s) 120 may be used to monitor whether the packages are backed up within the MHE 104 and cross certain thresholds, boundaries, etc. For example, when the packages are backed up to certain location within the MHE 104, such as close to the inlet 106 and/or within a certain threshold distance of the inlet 106, a jam may be present. In some instances, the sensor(s) and/or device(s) 120 may be a component of the MHE 104 (e.g., coupled thereto), a component of the de-jamming mechanism(s) 102, or may be a separate. For example, as shown, the sensor(s) and/or device(s) 120 may communicatively couple to the de-jamming mechanism(s) 102.

In some instances, the de-jamming mechanism(s) 102 may receive instructions from the sensor(s) and/or device(s) 120 for causing the actuator(s) 118 to move the wedge(s) 112. Additionally, or alternatively, the de-jamming mechanism(s) 102 may receive the sensor data 122 for use in determining whether to actuate the actuator(s) 118. For example, the de-jamming mechanism(s) 102 may analyze the sensor data 122 to determine whether the MHE 104 is jammed and whether to actuate the wedge(s) 112 via the actuator(s) 118. However, although described as being actuated in the event of a jam, in some instances, the de-jamming mechanism(s) 102 may be actuated to proactively prevent jams. For example, even if no jams are detected in the MHE 104, the de-jamming mechanism(s) 102 may be actuated according to certain schedules (e.g., once every ten minutes), when a certain amount of packages have been diverted to the MHE (e.g., one hundred), and so forth.

In some instances, the de-jamming mechanism(s) 102 may be remotely operated, for example, via a device of an associate working in the environment, or via computing resource(s) 124 disposed within or remote from the environment. For example, the computing resource(s) 124 may receive the sensor data 122 for determining whether a jam is present in the MHE 104. As shown, the computing resource(s) 124 may include processor(s) 126 and memory 128, where the processor(s) 126 may perform various functions and operations associated with controlling the de-jamming mechanism(s) 102, and the memory 128 may store instructions executable by the processor(s) 114 to perform the operations described herein. Still, in some instances, a button may be located along the MHE 104 and/or at the de-jamming mechanism(s) 102 to manually operate the de-jamming mechanism(s) 102 or cause the de-jamming mechanism(s) 102 to operate. In some instances, when a jam is detected, indication(s) (e.g., audible, visual, etc.) such as alarms, alerts, etc. may be output for notifying associates.

The de-jamming mechanism(s) 102 may be controlled to operate according to certain setting(s) 130, such as speeds, extension lengths, and so forth. For example, a speed may control how fast, or slow, wedge(s) 112 acuate to extend into and retract from the MHE 104. The extension lengths, for example, may control how far into the MHE 104 the wedge(s) 112 extend. The setting(s) 130 may be dynamically set according to specific(s) of the environment, a weight of the packages transported through the MHE 104, a traffic volume through the MHE 104, and so forth.

Although the de-jamming mechanism(s) 102, the sensor(s) and/or device(s) 120, and the computing resource(s) 124 are shown and described as separate components, systems, modules, etc. in some instances, the de-jamming mechanism(s) 102, the sensor(s) and/or device(s) 120, and the computing resource(s) 124 may be integrated within one another or more components may be included. Any level of split processing may be performed by the de-jamming mechanism(s) 102, the sensor(s) and/or device(s) 120, and the computing resource(s) 124 to cause the wedge(s) 112 to actuate. The de-jamming mechanism(s) 102, the sensor(s) and/or device(s) 120, and the computing resource(s) 124 may communicatively couple to one another via one or more network(s) 132. The one or more network(s) 132 may be representative of any type of network, such as wired network(s), wireless network(s), etc. The de-jamming mechanism(s) 102 may include interface(s) 134 (e.g., Wi-Fi, Bluetooth, etc.) for communicating over the network(s) 132. Although not shown, the sensor(s) and/or device(s) 120, and the computing resource(s) 124, may include interface(s) 134.

The de-jamming mechanism(s) may also include one or more adjustment mechanism(s) that adjust a yaw, pitch, and/or roll of the wedge(s) 112. For example, depending upon specifics of the environment and/or the MHE 104, the yaw, pitch, and/or roll may be adjusted. In some instances, the adjustment mechanism(s) may be adjusted such that the wedge(s) 112 extend into the MHE perpendicular to the surface 110 of the MHE 104 on which the packages slide. The adjustment mechanism(s) may include fasteners, cranks, levers, keyed slots, etc.

The computing resource(s) 124 may be implemented as one or more servers and may, in some instances, form a portion of a network-accessible computing platform implemented as a computing infrastructure of processors, storage, software, data access, etc. that is maintained and accessible via a network such as the Internet. The computing resource(s) 124 does not require end-user knowledge of the physical location and configuration of the system that delivers the services. Common expressions associated with the computing resource(s) 124 include "on-demand computing", "software as a service (SaaS)", "platform computing", "network-accessible platform", "cloud services", "data centers", etc. However, in some instances, the computing resource(s) 124 may be located within a same environment as the de-jamming mechanism(s) 102.

As used herein, a processor, such as the processor(s) 114 and/or the processor(s) 126, may include multiple processors and/or a processor having multiple cores. Further, the processor(s) 114 and/or the processor(s) 126 may comprise one or more cores of different types. For example, the processor(s) 114 and/or the processor(s) 126 may include application processor units, graphic processing units, and so forth. In one implementation, the processor(s) 114 and/or the processor(s) 126 may comprise a microcontroller and/or a microprocessor. The processor(s) 114 and/or the processor(s) 126 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114 and/or the processor(s) 126 may possess its own local memory, which also may store program components, program data, and/or one or more operating systems.

Memory, such as the memory 116 and/or the memory 128, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 114 and the processor(s) 126. The memory 116 and/or the memory 128 is an example of non-transitory computer-readable media. The memory 116 and/or the memory 128 may store an operating system and one or more software applications, instructions, programs, and/or data to implement the methods described herein and the functions attributed to the various systems.

FIGS. 2A-2D illustrate details of the MHE 104, according to examples of the present disclosure. As introduced above, the MHE 104 may include the inlet 106 in which packages enter the MHE 104, and the outlet 108 in which the packages exit the MHE 104. Between the inlet 106 and the outlet 108, the packages may slide along the surface 110. The surface 110 may be defined by any number of segments, sections, panels, etc. that form the MHE 104. The panels 200 may be secured together via welds, fasteners, etc. Additionally, sidewalls 202 may extend between the inlet 106 and the outlet 108 to prevent the packages falling out of the MHE 104.

The MHE 104 may include a frame 204 having one or more legs, bars, struts, etc. that dispose the MHE 104 above a ground surface (e.g., floor) of the environment. The legs, bars, struts, etc. may be adjustable in length, for example, to adjust a height of the MHE 104 and/or to support the MHE 104 at different heights. The legs, bars, struts, etc. may be secured to the ground surface using fasteners.

The de-jamming mechanism(s) 102 are shown being located more proximate to the outlet 108 as compared to the inlet 106. For example, in some instances, packages may be prone to jamming an interface, or intersection, between the outlet 108 and a conveyor onto which the packages within the MHE 104 are deposited. As such, the de-jamming mechanism(s) 102 may be disposed more proximate to the outlet 108 in order to clear jams that are located more proximate to the outlet 108. However, the de-jamming mechanism(s) 102 may be disposed at additional or alternative locations along the MHE 104. For example, in addition to the de-jamming mechanism(s) 102 being disposed proximate to the outlet 108, one or more additional de-jamming mechanism(s) 102 may be disposed proximate to the inlet 106, or at a location between the inlet 106 and the outlet 108.

The wedge(s) 112 of the de-jamming mechanism(s) 102 are shown extending through a bottom of the MHE 104. However, the wedge(s) 112 may be disposed through other portions of the MHE 104, such as along the sidewalls 202. When actuated, the wedge(s) 112 may be rotated into the MHE 104. In their resting state, for example, as shown in FIGS. 2A-2D a surface of the wedge(s) 112 may be flush with the surface 110 of the MHE 104. In doing so, in the resting sate, or when the wedge(s) 112 are not actuated, the wedge(s) 112 may not act as a block, barrier, etc. that prevents the packages flowing through the MHE 104. As such, packages may slide over the top of the wedge(s) 112. However, when actuated, the surface of the wedge(s) 112 extends above the surface 110 (e.g., in the Y-direction, about the Z-axis) to dislodge, move, etc. packages that have become jammed in the MHE 104. As will be discussed herein, the MHE 104 may include one or more slots in which the wedge(s) 112 are respectively disposed. In some instances, the wedge(s) 112 may extend into the MHE 104 in a direction that is perpendicular to the surface 110 of the MHE 104 through which the wedge(s) 112 are disposed.

Figure 3A:
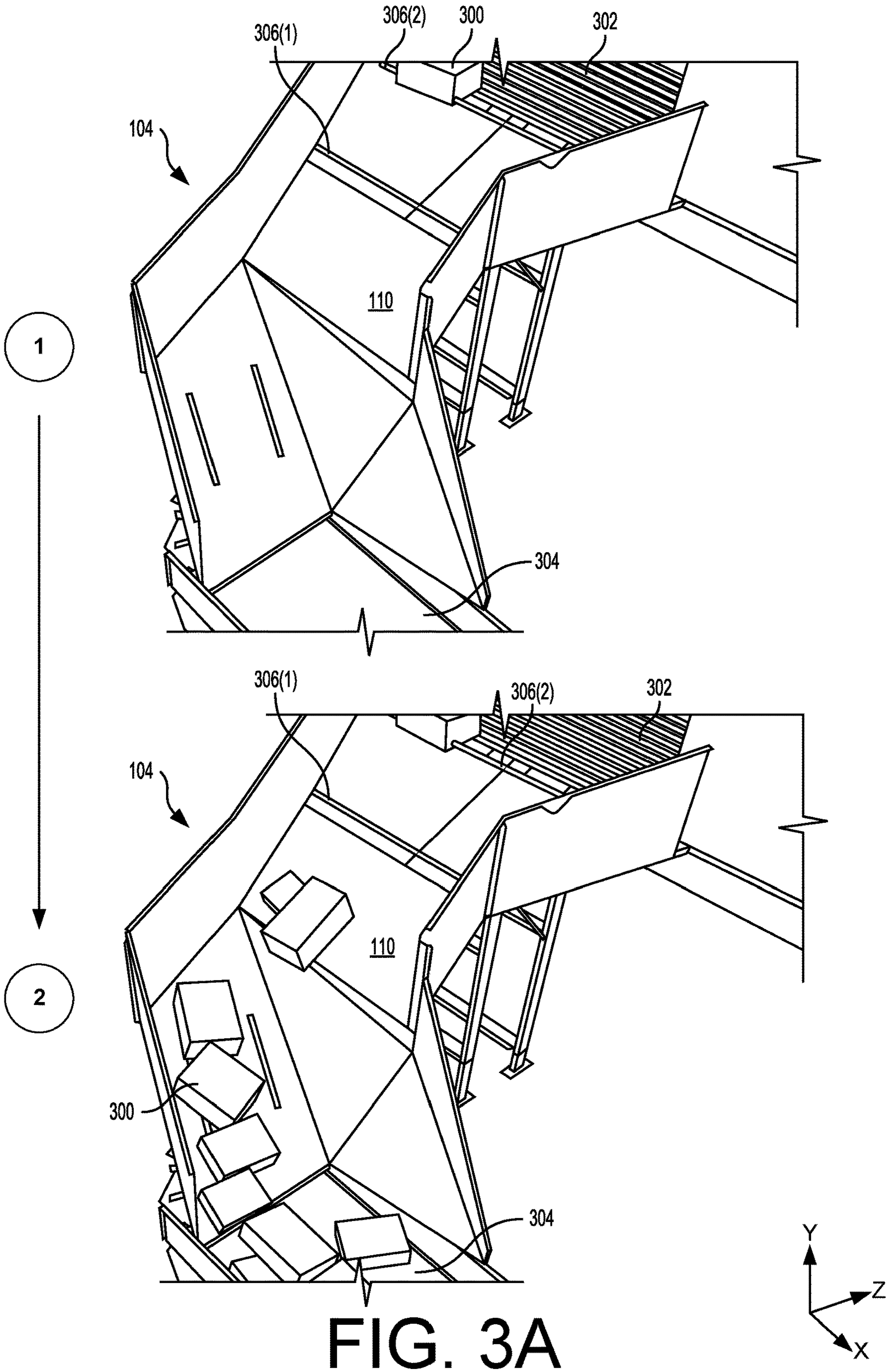
FIGS. 3A-3C illustrate an example sequence of operations of the de-jamming mechanism(s) of FIG. 1, according to examples of the present disclosure.
Figure 3B:
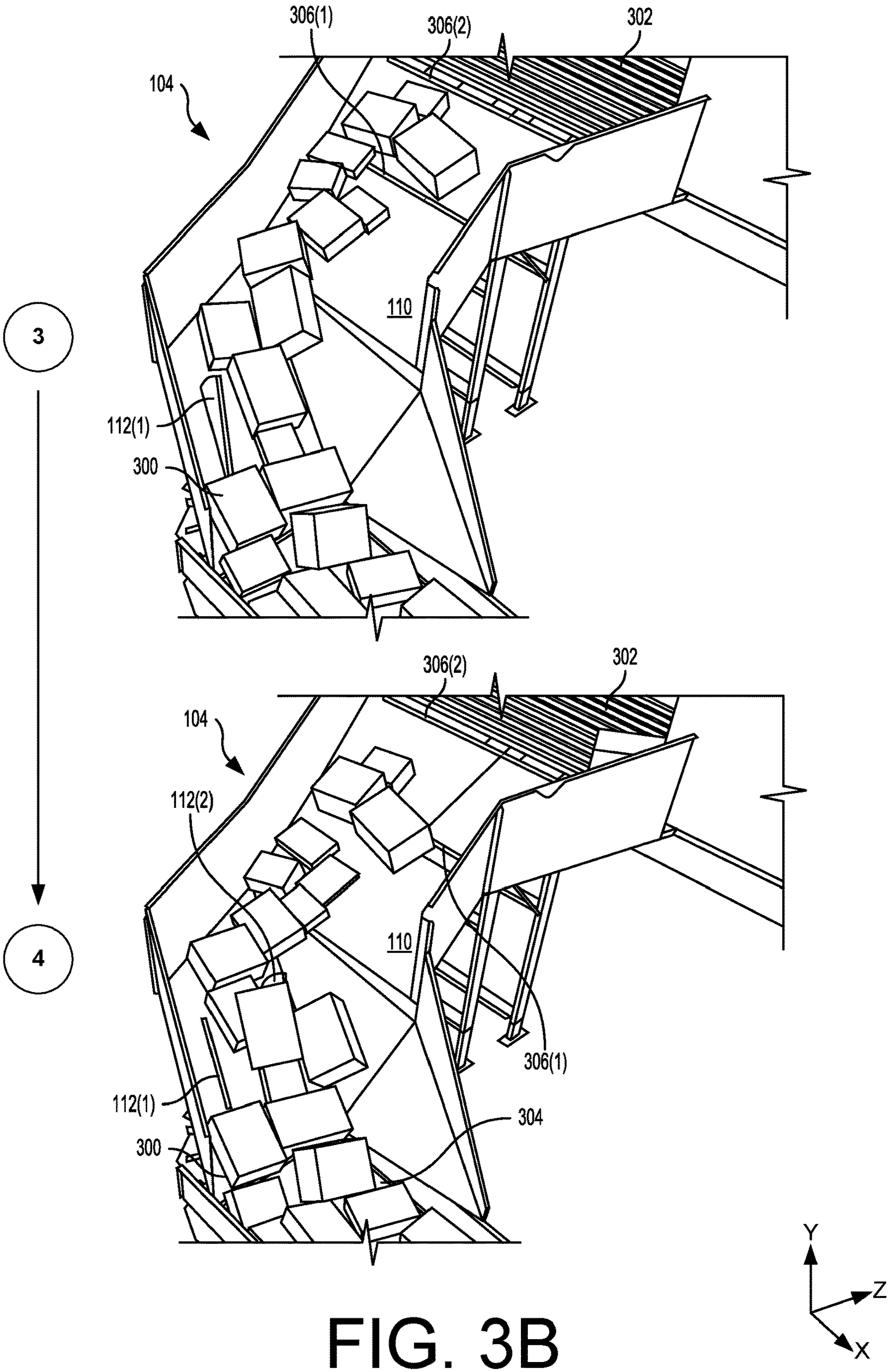
Figure 3C:
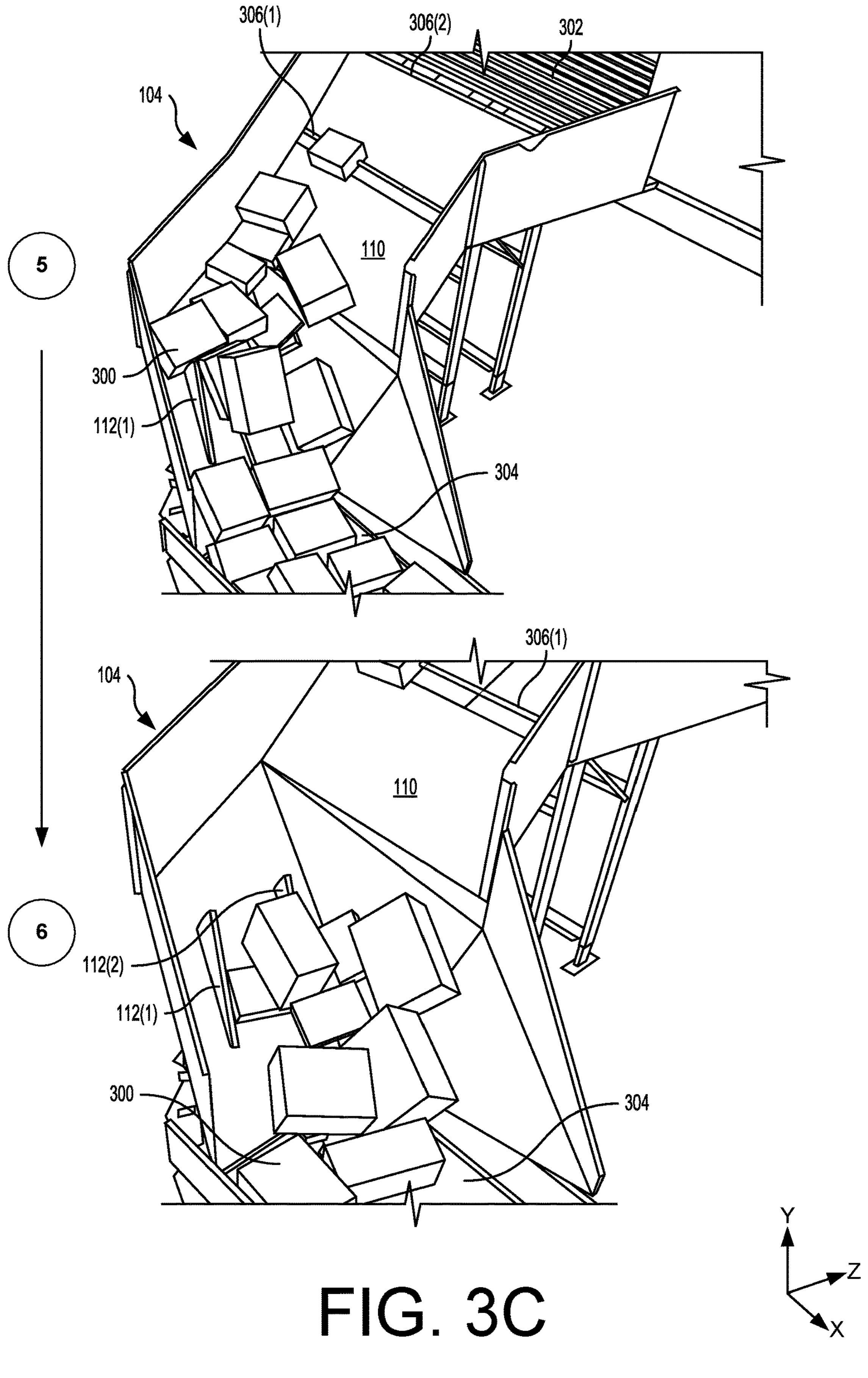

FIGS. 3A-3C illustrate a sequence of operations for using the de-jamming mechanism(s) 102 to clear a jam within the MHE 104. Beginning at "1" in FIG. 3A, the de-jamming mechanism(s) 102 are shown in a retracted state in which a surface of the wedge(s) 112 is flush, planar, etc. with the surface 110 of the MHE 104. Consequently, packages 300 may flow through the MHE 104, for example, form a first conveyor 302 to a second conveyor 304. In some instances, the MHE 104 may be used to redirect the packages 300 from the first conveyor 302 to the second conveyor 304.

As will be explained herein, the MHE 104 may have or be associated with fill lines 306, such as a first fill line 306(1) and a second fill line 306(2). The fill lines 306 may represent certain locations on the MHE 104 associated with the MHE 104 being jammed. For example, the first fill line 306(1) may be located more proximate to the outlet 108 as compared to second fill line 306(2). The sensor(s) and/or device(s) 120 may be configured to monitor the MHE 104 at locations corresponding to the fill lines 306, and/or may determine when the packages 300 have become backed up beyond the fill lines 306 (e.g., indicating a jam). For example, in the event that the packages 300 become jammed within the MHE 104, and additional packages are deposited into the MHE 104, the packages 300 may begin to back up within the MHE 104. As the packages 300 back up, the packages 300 may cross over, breach, break, etc. the fill lines 306.

In some instances, when the packages 300 are backed up beyond the first fill line 306(1), the de-jamming mechanism(s) 102 may be actuated. When the packages 300 are backed up beyond the second fill line 306(2), packages 300 may be restricted from being diverted into the MHE 104 in order to avoid backing up onto the first conveyor 302. Although the fill lines 306 are shown at certain locations, the fill lines 306 may be associated with other locations along the MHE 104. The fill lines 306 may be dynamically set, and the sensor(s) and/or device(s) 120 may be configured to monitor the fill lines 306, or a portion of the MHE 104 associated with the fill lines 306. However, instead of using the fill lines 306, sensor(s) and/or device(s) 120 may more generally monitor the MHE 104 for determining whether the jam is present (e.g., a threshold number of packages 300 within the MHE 104, a certain volume of the MHE 104 being full, and so forth).

At "2" in FIG. 3A, the packages 300 are shown flowing through the MHE 104. For example, the packages 300 may flow into the MHE 104 and out the MHE 104, onto the second conveyor 304. At "3" in FIG. 3B, the packages 300 are shown being or becoming jammed in the MHE 104. As discussed above, a jam may be present when the packages 300 back up beyond the first fill line 306(1). The sensor(s) and/or device(s) 120 may generate sensor data 122 indicative of the packages 300 extending over the first fill line 306(1). The sensor(s) and/or device(s) 120, for example, may include LIDAR, camera(s), etc. that generate the sensor data 122 indicative of the packages 300 in the MHE 104, which may be used to subsequently determine whether a jam is present along the MHE 104. In some instances, the sensor data 122 may be used by the de-jamming mechanism(s) 102 to actuate the wedge(s) 112. In other instances, the sensor(s) and/or device(s) 120, and/or the computing resource(s) 124, may instruct the de-jamming mechanism(s) 102 to operate.

For example, as also shown at "3" in FIG. 3B, the first wedge 112(1) may be actuated. Actuating the first wedge 112(1) causes the first wedge 112(1) to rotate into the MHE 104 to dislodge, move, engage, etc. the packages 300 to clear the jam. The first wedge 112(1) may be actuated in a first direction into the MHE 104. While the first wedge 112(1) is being actuated, the second wedge 112(2) may be retracted, so as to not break the surface 110 of the MHE 104 or may not be extending into the MHE 104 (e.g., yet to be actuated). In doing, the packages 300 may still flow over the top of the second wedge 112(2), however, being as the first wedge 112(1) is extended, the packages 300 may not flow over the first wedge 112(1) until the first wedge 112(1) is retracted.

For example, as shown at "4" in FIG. 3B, the first wedge 112(1) may be retracted while the second wedge 112(2) may be extended. This cyclical movement, of the first wedge 112(1) and the second wedge 112(2), between the extended position and retracted position, may permit the packages 300 to flow over one of the wedge(s) 112. In other words, if both the first wedge 112(1) and the second wedge 112(2) were extended into the channel, the first wedge 112(1) and the second wedge 112(2) may block packages flowing through the MHE 104. As such, when one of the wedge(s) 112, such as the first wedge 112(1), is extending, another of the wedge(s) 112, such as the second wedge 112(2), may be retracting. This movement of the wedge(s) 112 may be considered an asynchronous movement. In comparison, if the wedge(s) 112 were to move in the same direction, or extending and retracting at the same time, the movement of the wedge(s) 112 may be considered a synchronous movement. In some instances, whether the wedge(s) 112 move in asynchronous or synchronous movement may be based at least in part on specific(s) of the MHE 104 (e.g., size, shape, etc.), specific(s) of the jam (e.g., amount of packages 300, length of jam up the MHE 104, etc.), a weight of the package(s) 300, and the like.

As shown at "5" in FIG. 3C, as a result of the de-jamming mechanism(s) 102 being actuated, the jam in the MHE 104 may be reduced. For example, at "5" in FIG. 3C, the first wedge 112(1) may be extending, while the second wedge 112(2) may be retracting. Moreover, continuing to "6" in FIG. 3C, the first wedge 112(1) may be retracting while the second wedge 112(2) may be extending. As noted above, the cyclical movement of the wedge(s) 112, such as their asynchronous movement, may permit the packages 300 to flow through the MHE 104 as the packages 300 become unjammed. In some instances, the de-jamming mechanism(s) 102 may be individually, or collectively, controlled. In some instances, the asynchronous movement may be caused by actuating the first wedge 112(1) at a first instance in time and then actuating the second wedge 112(2) at a second instance in time that is after the first instance in time. For example, the first wedge 112(1) may be extending into the MHE 104 at the first instance in time, and when the first wedge 112(1) is retracting, the second wedge 112(2) may be actuated to extend into the MHE 104.

In some instances, the de-jamming mechanism(s) 102 may continue to actuate until the jam is cleared, until the jam is reduced by a threshold amount, until only a certain number of packages are in the MHE 104, and so forth. For example, the sensor(s) and/or device(s) 120 may generate the sensor data 122 that is used to determine whether the jam is cleared, still present, etc. If the jam is still present (e.g., the packages 300 extend above the first fill line 306(1)), the de-jamming mechanism(s) 102 may still actuate. As noted above, sensor(s) and/or device(s) 120 may instruct the de-jamming mechanism(s) 102 to actuate, or the de-jamming mechanism(s) 102 may receive the sensor data 122 for use in determining whether to actuate the de-jamming mechanism(s) 102.

Once the de-jamming mechanism(s) 102 are no longer actuated, the wedge(s) 112 may return to a resting state. At the resting state, a surface of the wedge(s) 112 may be flush with the surface 110 of the MHE 104 in order to permit the packages 300 to flow over (e.g., over a top) of the wedge(s) 112.

Figure 4:
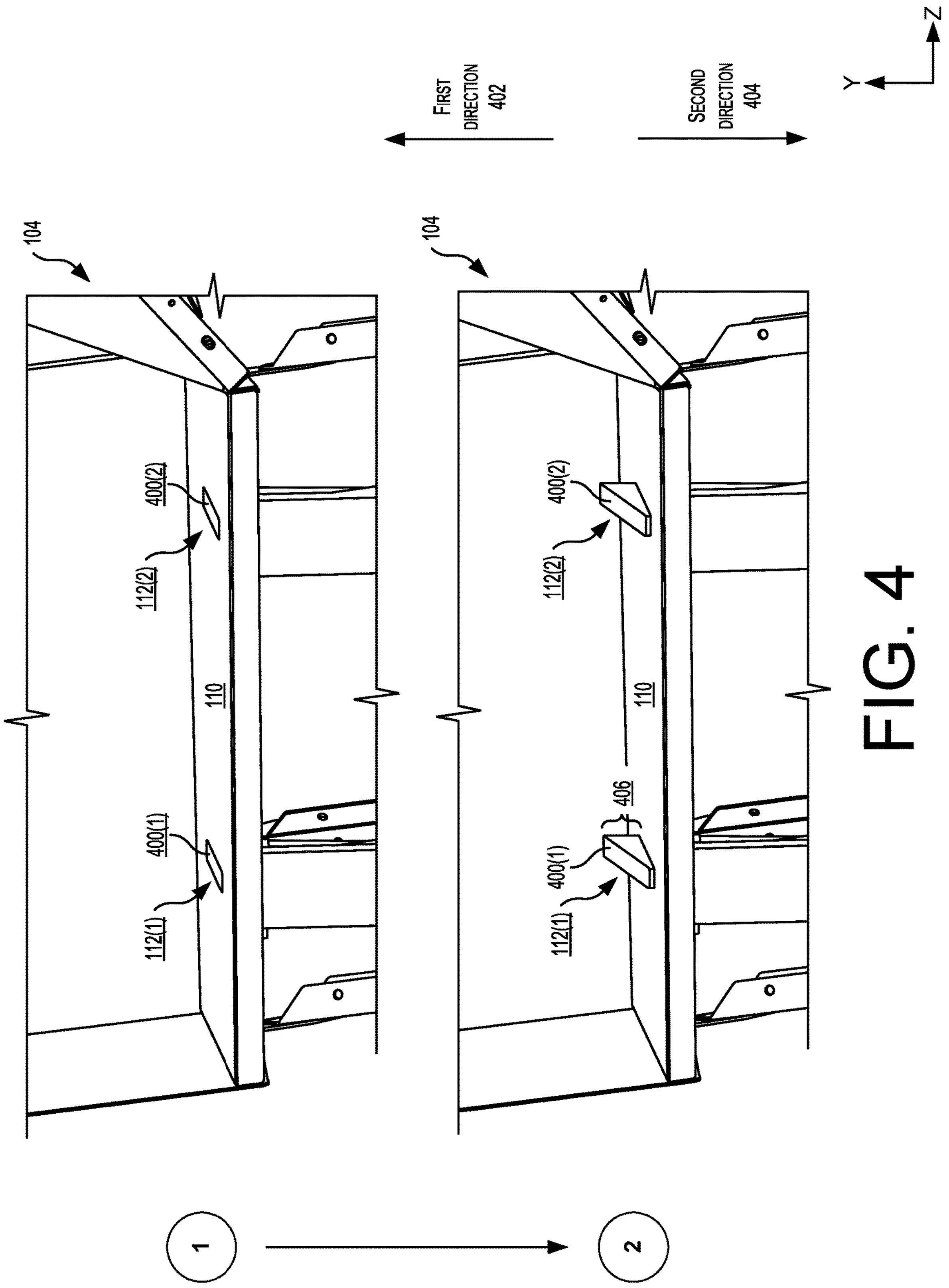
FIG. 4 illustrates an example operation of the de-jamming mechanism(s) of FIG. 1, according to examples of the present disclosure.

FIG. 4 illustrates an example operation of the wedge(s) 112, according to examples of the present disclosure. The wedge(s) 112 may include a surface 400 that, when the de-jamming mechanism(s) 102 are in their resting state or retracted state, may be flush (e.g., planar, flat, etc.) with the surface 110 of the MHE 104. For example, at "1" in FIG. 4, the surface 400(1) of the first wedge 112(1) and the surface 400(2) of the second wedge 112(2) may be flush with the surface 110 of the MHE 104.

In some instances, the surface 110 of the MHE 104 may or may not be planar with the ground surface. For example, the surface 110 may be angled, tilted, slanted, etc. relative to the ground surface. As will be explained herein, the de-jamming mechanism(s) 102 may include adjustment mechanism(s) that may adjust a yaw, pitch, and/or roll of the de-jamming mechanism(s) 102, such that when the wedge(s) 112 are actuated, the wedge(s) 112 may extend into the MHE 104 perpendicular to the surface 110.

For example, at "2" in FIG. 4, the first wedge 112(1) and the second wedge 112(2) are shown extending into the MHE 104, above the surface 110 (e.g., in the Y-direction). In some instances, the first wedge 112(1) may be extending in a first direction 402 into the MHE 104, while the second wedge 112(2) may be extending in a second direction 404, opposite the first direction 402, out of the MHE 104. This opposite movement of the wedge(s) 112 may be considered an asynchronous movement. As such, when the actuator 118 for the first de-jamming mechanism 102(1) is extending the first wedge 112(1) into the MHE 104, the actuator 118 for the second de-jamming mechanism 102(2) may be retracting the second wedge 112(2) out of the MHE 104. Once the second wedge 112(2) has been retracted such that the surface 400(2) is flush with the surface 110, the actuator 118 for the second wedge 112(2) may reverse direction and extend the second wedge 112(2) the MHE 104. The position of the actuator 118, when the surface 400(2) of the second wedge 112(2) is flush with the surface 110, may be recorded in the setting(s) 130. In doing so, the surface 400 of the wedge(s) 112 may not be below (e.g., sub) the surface 110. The same is true for the first wedge 112(1), such that when the first wedge 112(1) extends to a limit of the extended state, such as a distance 406, the actuator 118 may reverse direction to retract the first wedge 112(1). The setting(s) 130 may control how far the wedge(s) 112 are extended into the MHE 104, a time taken to complete a cycle (e.g., extend and retract), and so forth.

As indicated above, the adjustment mechanism(s) of the de-jamming mechanism(s) 102 may be adjusted such that the wedge(s) 112 extend into the MHE 104, and retract from the MHE 104, perpendicular to the surface 110. When the actuator(s) 118 actuate, the wedge(s) 112 may be rotated to extend into and retract from the MHE 104.

Figure 5A:
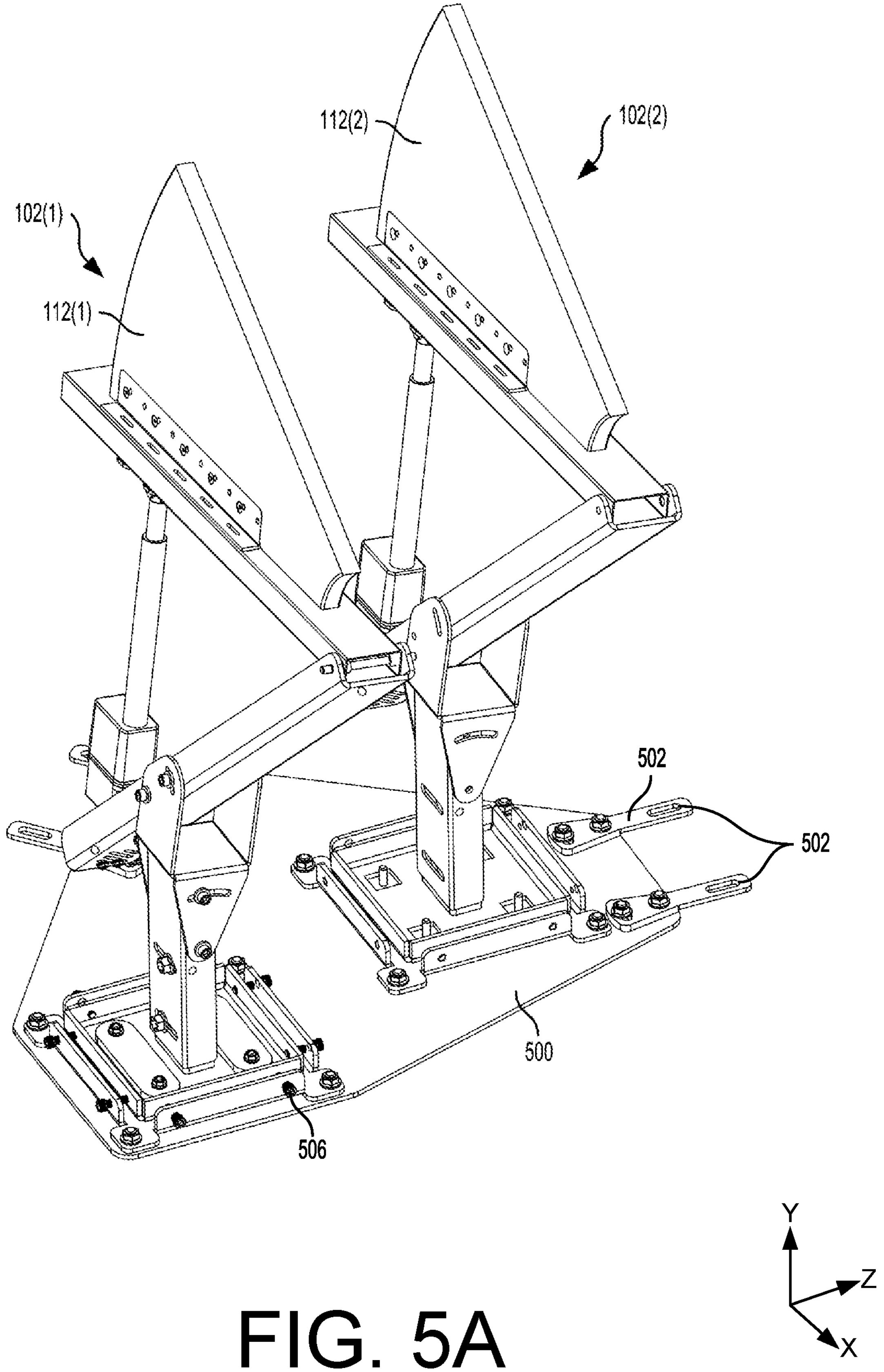
FIGS. 5A and 5B illustrate example views of the de-jamming mechanism(s) of FIG. 1, according to examples of the present disclosure.
Figure 5B:
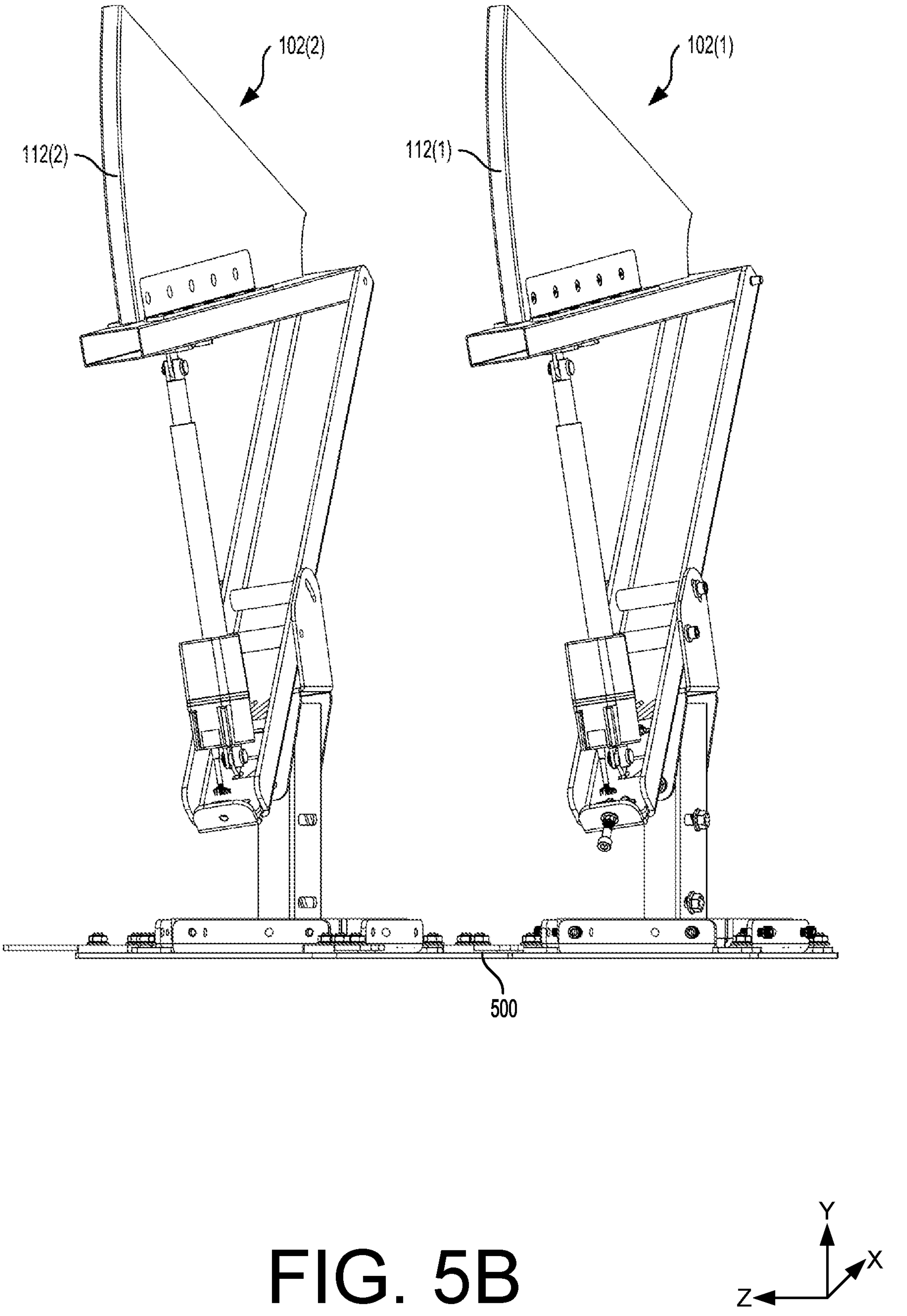

FIGS. 5A and 5B illustrate the first de-jamming mechanism 102(1) and the second de-jamming mechanism 102(2), according to examples of the present disclosure. In some instances, the first de-jamming mechanism 102(1) and the second de-jamming mechanism 102(2) may be considered a system. For example, the system may include the first de-jamming mechanism 102(1) and the second de-jamming mechanism 102(2), and in some instances, the MHE 104.

As introduced above, the first de-jamming mechanism 102(1) may have the first wedge 112(1) that extends into and retracts from the MHE 104, while the second de-jamming mechanism 102(2) may have the second wedge 112(2) that extends into and retracts from the MHE 104. In some instances, the wedge(s) 112 are the only portion of the de-jamming mechanism(s) 102 that extend into the MHE. All other components of the de-jamming mechanism(s) 102 may be disposed external (e.g., beneath, beside, etc.) the MHE 104 and/or the surface 110.

The de-jamming mechanism(s) 102 may couple to a plate 500 that is securable to a floor within the environment. The de-jamming mechanism(s) 102 may be coupled to the plate 500 using fasteners, or other means. Any number of the de-jamming mechanism(s) 102 may be coupled to the plate 500. However, although described as being coupled to the plate 500, the plate 500 and/or members of the de-jamming mechanism(s) 102 may be coupled to the frame 204 of the MHE 104 (e.g., legs).

The plate 500 may have one or more arms 502 with slots 504, respectively. Fasteners may be disposed through the slots 504, as well as through the frame 204 of the MHE 104. This may couple the plate 500, and therefore the de-jamming mechanism(s) 102 to the MHE 104. It is envisioned that over the course of time, the MHE may slightly reorient, shift, etc. By coupling the plate 500 to the frame 204, the de-jamming mechanism(s) 102 may move with the MHE 104.

As shown, the de-jamming mechanism(s) 102 may be slightly off-axis, tiled, angled, slanted, etc. from vertical (e.g., Y-plane). This off-axis tilt may orient the wedge(s) 112 such that during actuation, the wedge(s) 112 extend into the MHE 104 perpendicularly to the surface 110. The off-axis tilt, as will be explained herein, may be accomplished via one or more adjustment mechanism(s). In some instances, the de-jamming mechanism(s) 102 may couple to the plate 500 via one or more adjustment mechanism(s) 506. The one or more adjustment mechanism(s) 506 may adjust the de-jamming mechanism(s) 506 along one or more axes (e.g., along the X-axis, Y-axis, and/or Z-axis). The adjustment mechanism(s) 506 may represent fasteners that are capable of being rotated to adjust a position of the de-jamming mechanism(s) 102 related to the MHE 104.

Figure 6A:
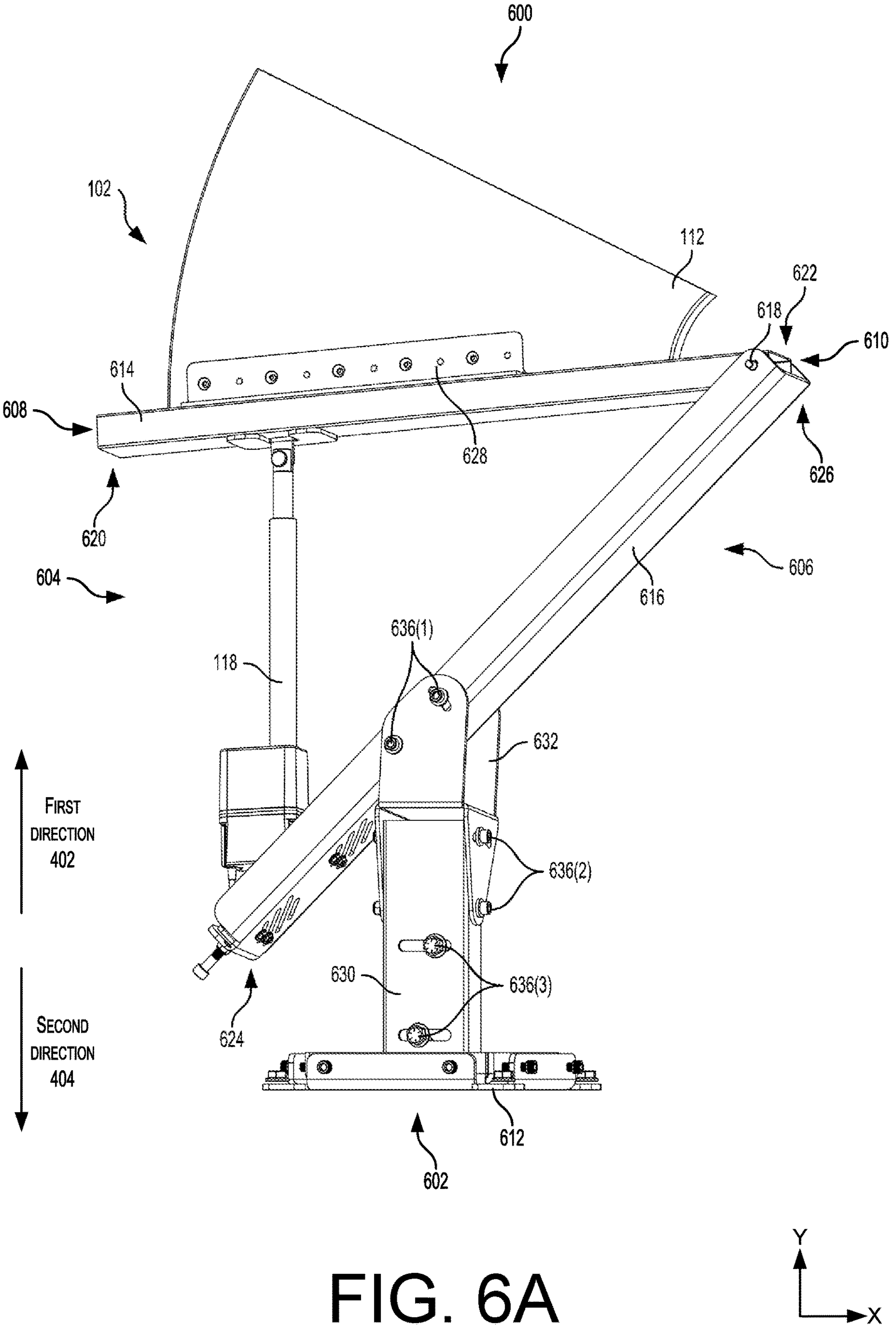
FIGS. 6A-6C illustrate details of a de-jamming mechanism of FIG. 1, according to examples of the present disclosure.
Figure 6B:
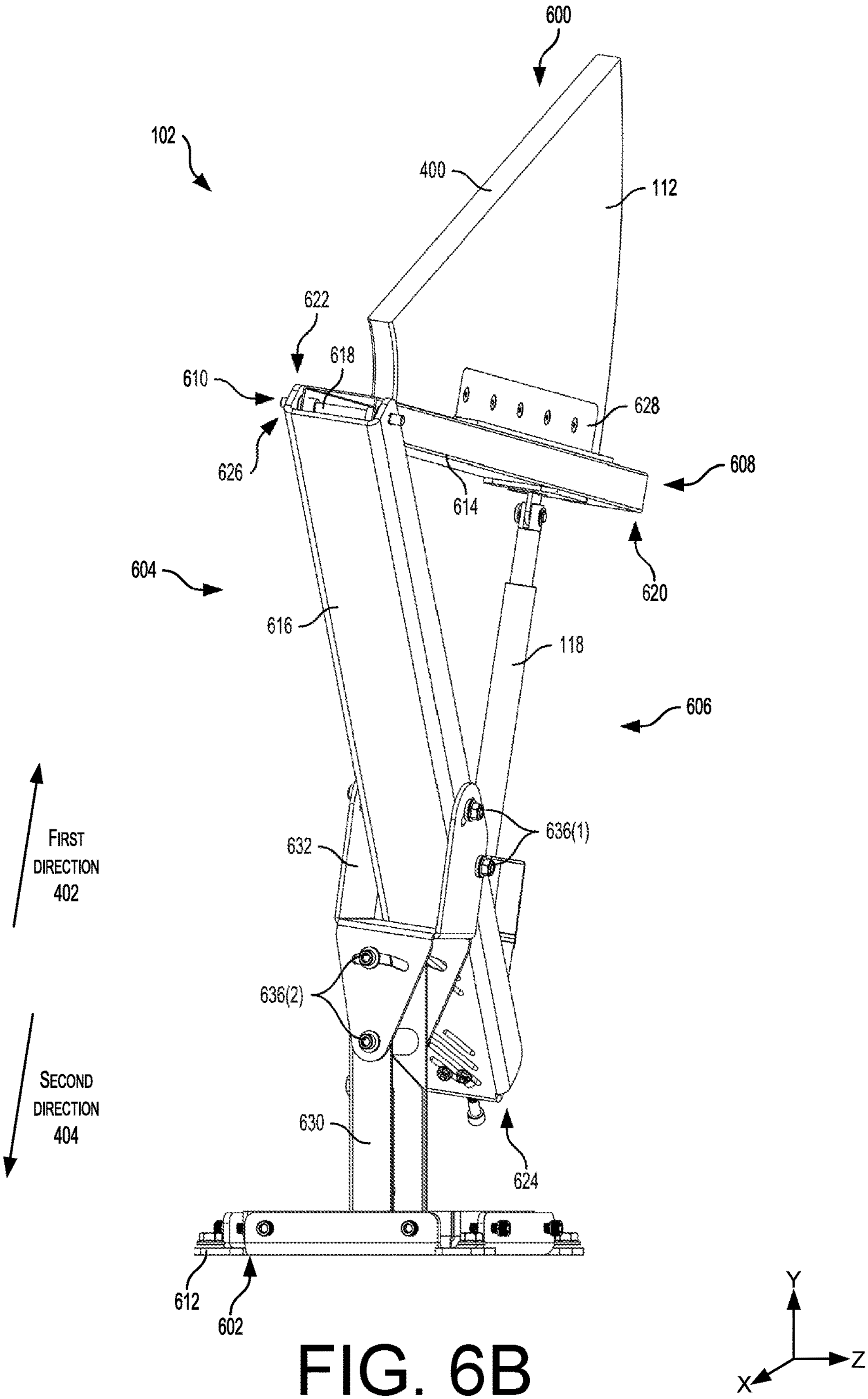
Figure 6C:
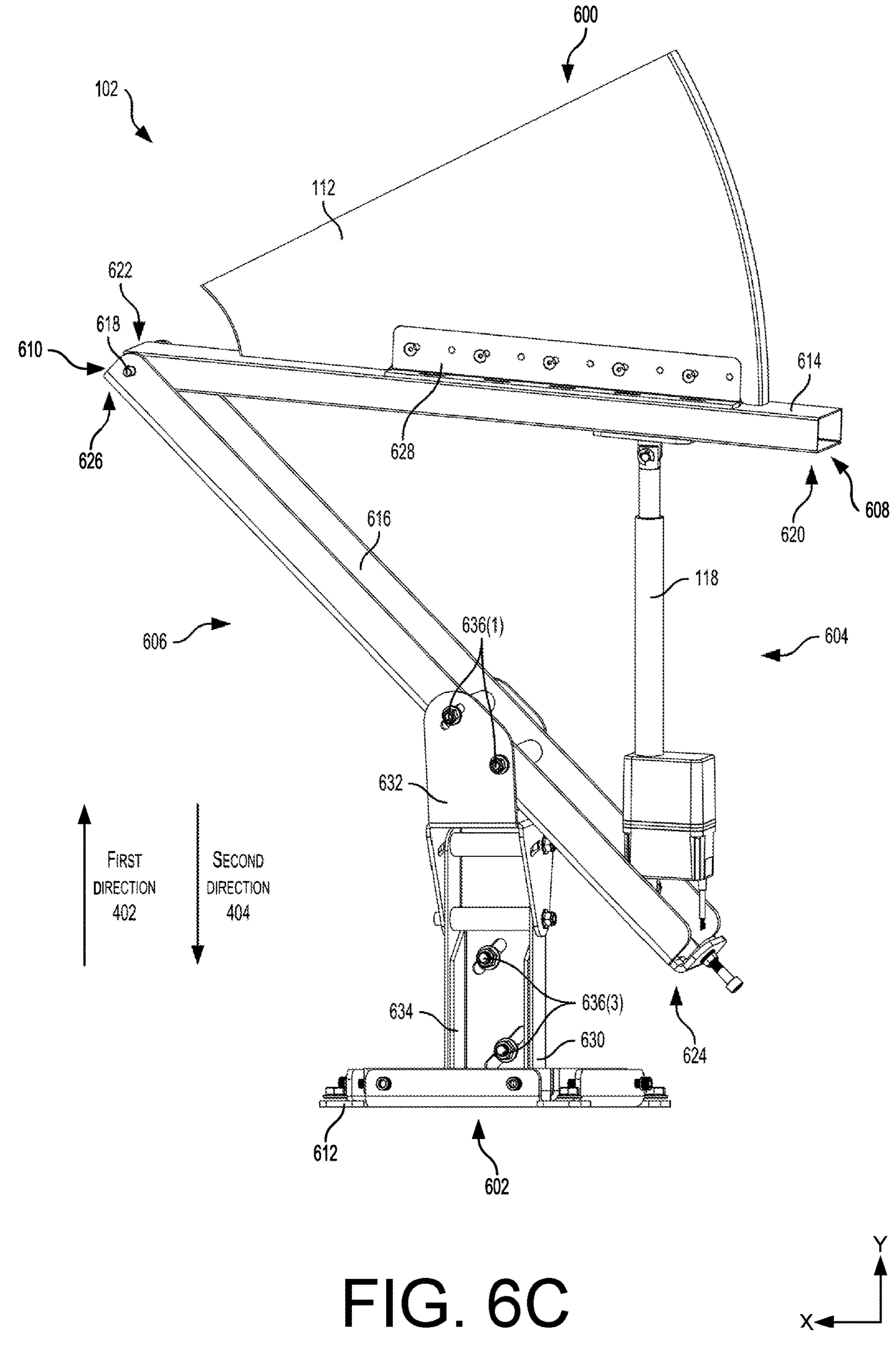

FIGS. 6A-6C illustrate details of the de-jamming mechanism 102, which may be representative of the first de-jamming mechanism 102(1) and/or the second de-jamming mechanism 102(2).

The de-jamming mechanism 102 may include a top 600, a bottom 602 opposite the top 600 (e.g., in the Y-direction), a first side 604, a second side 606 opposite the first side 604 (e.g., in the X-direction), a third side 608, and a fourth side 610 opposite the third side 608 (e.g., in the Z-direction). The wedge 112 may be disposed at the top 600. The bottom 602 may include a base 612 that couples to the plate 500, for example, via the adjustment mechanism(s) 506 to permit adjustment of the de-jamming mechanism(s) 102. In some instances, a wedge may be placed between the base 612 and the plate 500 for raising the de-jamming mechanism(s) 102 (e.g., in the Y-direction).

The de-jamming mechanism 102 includes a first arm 614 and a second arm 616 hingedly coupled together via a hinge 618. For example, the first arm 614 may include a first end 620 and a second end 622, and the second arm 616 may include a first end 624 and a second end 626 hingedly coupled to the second end 622 of the first arm 614 (e.g., about the hinge 618). The actuator 118 extends between the first arm 614 and the second arm 616, at a location proximate to the first end 620 and the first end 624. For example, the actuator 118 may be coupled to the first arm 614 proximate to the first end 620 and may be coupled to the second arm 616 proximate to the first end 624. In some instances, the coupling between the first arm 614 and the actuator 118 may represent a pinned connection that is free to rotate. Such movement may reduce a moment experienced as packages, for example, contact the wedge(s) 112 (e.g., from a side, rear, etc.) as they slide down the MHE 104. During actuation of the actuator 118, the first arm 614 and the second arm 616 may hinge about the hinge 618.

For example, the actuator 118 may actuate (e.g., extend) in the first direction 402 to push, advance, etc. the wedge 112 into the MHE 104. Once the actuator 118 extends in the first direction 402 by a given, set, or threshold amount, the actuator 118 may actuate (e.g., retract) in the second direction 404, opposite the first direction 402, to pull, withdraw, etc. the wedge 112 out of the MHE 104. However, as discussed above, the actuator 118 may be programmed such that the surface 400 of the wedge 112 does not extend below the surface 110 of the MHE 104. As such, the actuator 118 may have limits (e.g., in the setting(s) 130) that control how much the actuator 118 extends in the first direction 402 and retracts in the second direction 404. In some instances, the actuator 118 represent linear actuator, pneumatic actuator, hydraulic actuator, screw driver, ICE, or other suitable actuator.

The first arm 614 may include one or more flanges 628 for coupling to the wedge 112. Fasteners, for example, may be secured through the wedge 112 and the flanges 628 for coupling the wedge 112 to the first arm 614. The second arm 616 may be coupled to a leg 630 via a bracket 632. The leg 630 couple to the base 612 via a foot 634 (e.g., peg, strut, etc.).

The de-jamming mechanism 102 may include one or more adjustment mechanism(s) 636 for adjusting a position, orientation, etc. of the wedge 112, first arm 614, the second arm 616, the leg 630, etc. For example, a first adjustment mechanism 636(1) may be disposed at an interface between the second arm 616 and the bracket 632, such as a first end of the bracket 632. The first adjustment mechanism 636(1) may represent one or more fasteners disposed through one or more channels in the second arm 616. The fasteners may be loosened to adjust a position (e.g., pivot) of the second arm 616 (e.g., about the Z-axis), and consequently the first arm 614 and the wedge 112. A second adjustment mechanism 636(2) may be disposed at an interface between the bracket 632 and the leg 630, such as a second end of the bracket 632. The second adjustment mechanism 636(2) may represent one or more fasteners disposed through one or more channels in the leg 630. The fasteners may be loosened to adjust a position (e.g., pivot) of the bracket 632 (e.g., about the X-axis), and consequently, the wedge 112, the first arm 614, and the second arm 616. A third adjustment mechanism 636(3) may be disposed at an interface between the leg 630 and the foot 634. The third adjustment mechanism 636(3) may represent one or more fasteners disposed through one or more channels in the foot 634. The fasteners may be loosened to adjust a position (e.g., translation) of the leg 630 (e.g., in the X and/or Y direction), and consequently, the wedge 112, the first arm 614, and the second arm 616. Although certain adjustment mechanism(s) 636 are described, the de-jamming mechanism(s) 102 may include additional or alternative mechanism(s), etc. for adjusting the position, orientation, etc.

As introduced above, the adjustment mechanism(s) 636 may serve to adjust a position, orientation, etc. of the wedge 112 for accommodating the MHE 104. For example, using the adjustment mechanism(s) 636, the wedge(s) 112 may be fitted to the MHE 104 according to specifics of the MHE 104, or the surface 110 of the MHE 104, etc. By adjusting the adjustment mechanism(s) 636, the actuator 118 may configured to extend and retract the wedge 112 into and out of the MHE 104, for example, perpendicular to the surface 110. The adjustment mechanism(s) 636 may be used to prevent sides of the wedge 112 scrapping, bumping, etc. the slots in which the wedge(s) 112 are disposed. In some instances, a position of the actuator 118 at/along the first arm 614 and the second arm 616 may be adjusted to change a lifting power to extend the wedge 112.

In some instances, the first arm 614 may include a trough that funnels, catches, diverts, etc. liquid from within the MHE 104. For example, the packages 300 in the MHE 104 may include item(s) (e.g., household goods, electronics, products, etc.) that contain liquid. In some instances, the item(s) may break or become damaged and the liquid may leak through the packaging and onto the MHE 104. Given that the wedge(s) 112 are disposed in the slots that extend through the surface 110, the slots may form a pathway for liquid. The trough may be disposed on the first arm 614 such that if and when liquid seeps through the slots, the trough may divert the liquid away from the actuator 118 and/or into a collection point (e.g., on the first end 620 or the second end 622 of the first arm 614).

The first arm 614, the second arm 616, the leg 630, and/or the bracket 632 may be made of any suitable materials, such as metal, plastic, composites, etc. Although not shown, computing components that control an operation of the de-jamming mechanism 102 may be disposed along the base 612, the plate 500, or may be located elsewhere in the environment and communicatively coupled to the actuator 118, for example, via wired connection(s).

Figure 7A:
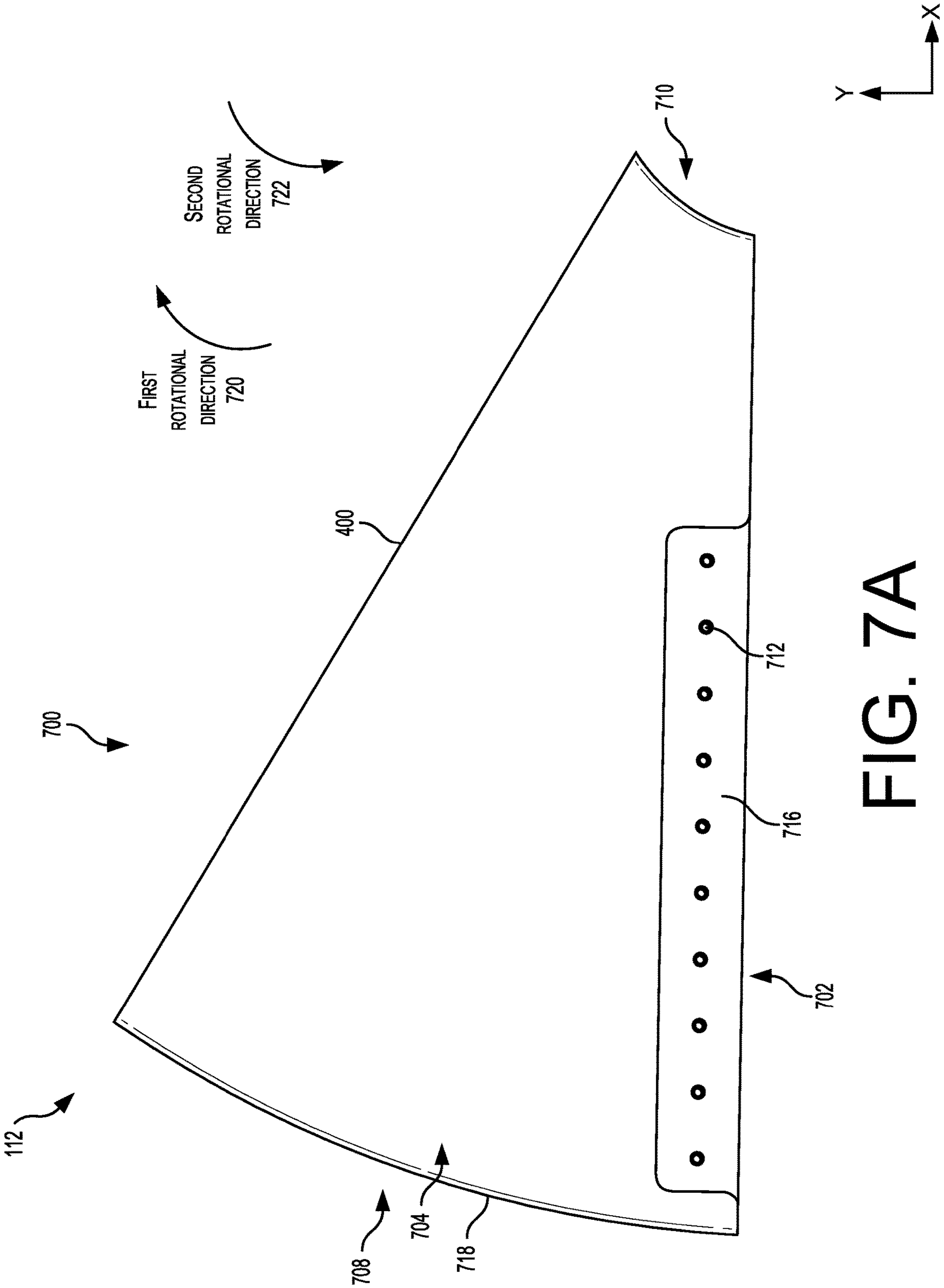

FIGS. 7A and 7B illustrate the wedge 112, according to examples of the present disclosure. The wedge 112 may be representative of the first wedge 112(1) and/or the second wedge 112(2). In some instances, the wedge(s) 112 may be similar or different, for example, in width, dimensions, material, etc.

The wedge 112 may generally represent a body that includes a top 700, a bottom 702 opposite the top 700 (e.g., in the Y-direction), a first side 704, a second side 706 opposite the first side 704 (e.g., in the Z-direction), a first end 708, and a second end 710 opposite the first end 708 (e.g., in the X-direction). The top 700 may include the surface 400 that, when the wedge 112 is in the resting state, is flush with the surface 110 of the MHE 104. The bottom 702 may be disposed along the first arm 614. For example, the wedge 112 may include one or more orifices 712 that at least partially extend through a thickness 714 of the wedge 112, from the first side 704 to the second side 706, and which receive fasteners. For example, the fasteners may be disposed through the flanges 628 to couple the wedge 112 to the first arm 614. In some instances, the orifices 712 are disposed within a depression 716, such that when the flange 628 couples to the wedge 112, a surface of the flange 628 is flush with the first side 704 and/or the second side 706.

The first end 708 and the second end 710 may include a curved profile, contour, etc. The curved nature of the first end 708 and the second end 710 permits the wedge 112 to be rotated into the MHE 104. As shown, the first end 708 may include a longer length than the second end 710 being as the hinge 618 is located closer to the second end 710 of the wedge 112 as compared to the first end 708 of the wedge 112. The curved nature of the first end 708 also permits a rear surface 718 of the wedge 112 to snuggly fit within the slots, thereby avoiding packages 300 being pinched or stuck at an interface between the slot and the first end 708. The top 700 may include a first length, while the bottom 702 may include a second length. The first length and the second length may be substantially the same such that during extension of the wedge 112 into the, the wedge 112 remains snug with the slot.

When the actuator 118 extends in the first direction 402, the wedge 112 rotates in a first rotational direction 720 into the MHE 104. When the actuator 118 retracts in the second direction 707, the wedge 112 rotates in a second rotational direction 722 out of the MHE 104, to a point where the surface 400 is flush with the surface 110 of the MHE 104. The setting(s) 130 may control how far the actuator 118 actuates to extend the wedge 112 into the MHE 104, and the retraction length of the actuator 118. The setting(s) 130 also indicate a resting state of the actuator 118 in which the surface 400 is flush with the surface 110 of the MHE 104. Given that the orientation and/or position of the wedge 112 may be variable given the adjustment(s) by the adjustment mechanism(s) 636, the setting(s) 130 may be adjustment to fit the wedge 112 to the MHE 104.

Figure 8:
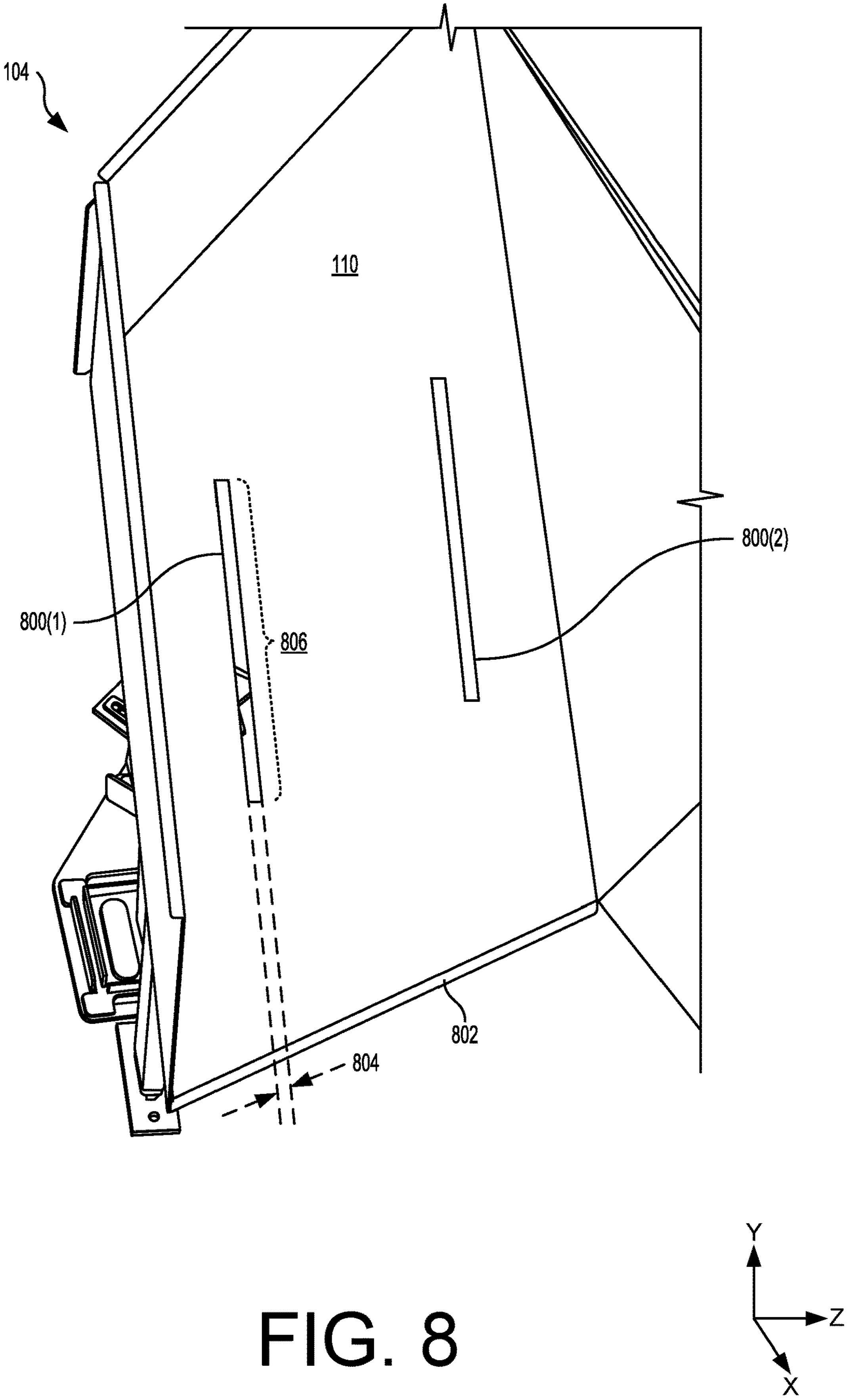
FIG. 8 illustrate example slots of the MHE of FIG. 1 in which the wedge of FIGS. 7A and 7B are at least partially disposed, according to examples of the present disclosure.

FIG. 8 illustrates example slots 800 of the MHE 104, according to examples of the present disclosure. The slots 800 may be disposed through a panel 802 (e.g., section, plate, etc.) that at least partially forms the MHE 104. The panel 802 may include the slots 800 for accommodating the wedge(s) 112 moving into the MHE 104. The slots 800 may represent channels, passageway, etc. The panel 802 may include as many slots 800 as the number of wedge(s) 112. For example, the panel 802 may include a first slot 800(1) for accommodating the first wedge 112(1) and a second slot 800(2) for accommodating the second wedge 112(2).

The slots 800 may include similar or different dimensions as one another. For example, the slots 800 may include a first dimension 804 (e.g., from side to side, in the Z-direction), and a second dimension 806 (e.g., from top to bottom, in the X-direction). The first dimension 804 may be longer than the thickness 714 of the wedge 112, and the second dimension 806 may be longer than the second length of the wedge 112. In some instances, a tolerance (e.g., 1.0 mm, 0.5 mm, etc.) between the wedge 112 and the slot 800 may be minimal to prevent the packages 300 (or material thereof), from snagging or catching at an interface between the slot 800 and the wedge 112. In some instances, the tolerance may be between 5 millimeters (mm), 10 mm, etc.

The first slot 800(1) may be spaced apart from a first side of the MHE 104 by a first distance, while the second slot 800(2) may be spaced apart from a second side of the MHE 104 by a second distance. The first distance and the second distance may be similar or different. Moreover, the first slot 800(1) and the second slot 800(2) may be spaced apart from one another by a third distance. In some instances, the first slot 800(1) and the second slot 800(2) may be parallel to one another, or may be non-parallel with one another. Further, as discussed above, the wedge(s) 112 may be located at different locations, points, etc. along the MHE 104 than shown, and in such instances, the slots 800 may be located differently than shown. In some instances, foams, brushes, etc. may be disposed within the first slot 800(1) and/or the second slot 800(2). In some instances, the foams, brushes, etc. may form the first slot 800(1) and/or the second slot 800(2). The foams, brushes, etc. may give way and/or be formable through an interaction with the wedge(s) 112 as a way to reduce a gap between the wedge(s) 112 and the MHE 104.

Figure 9:
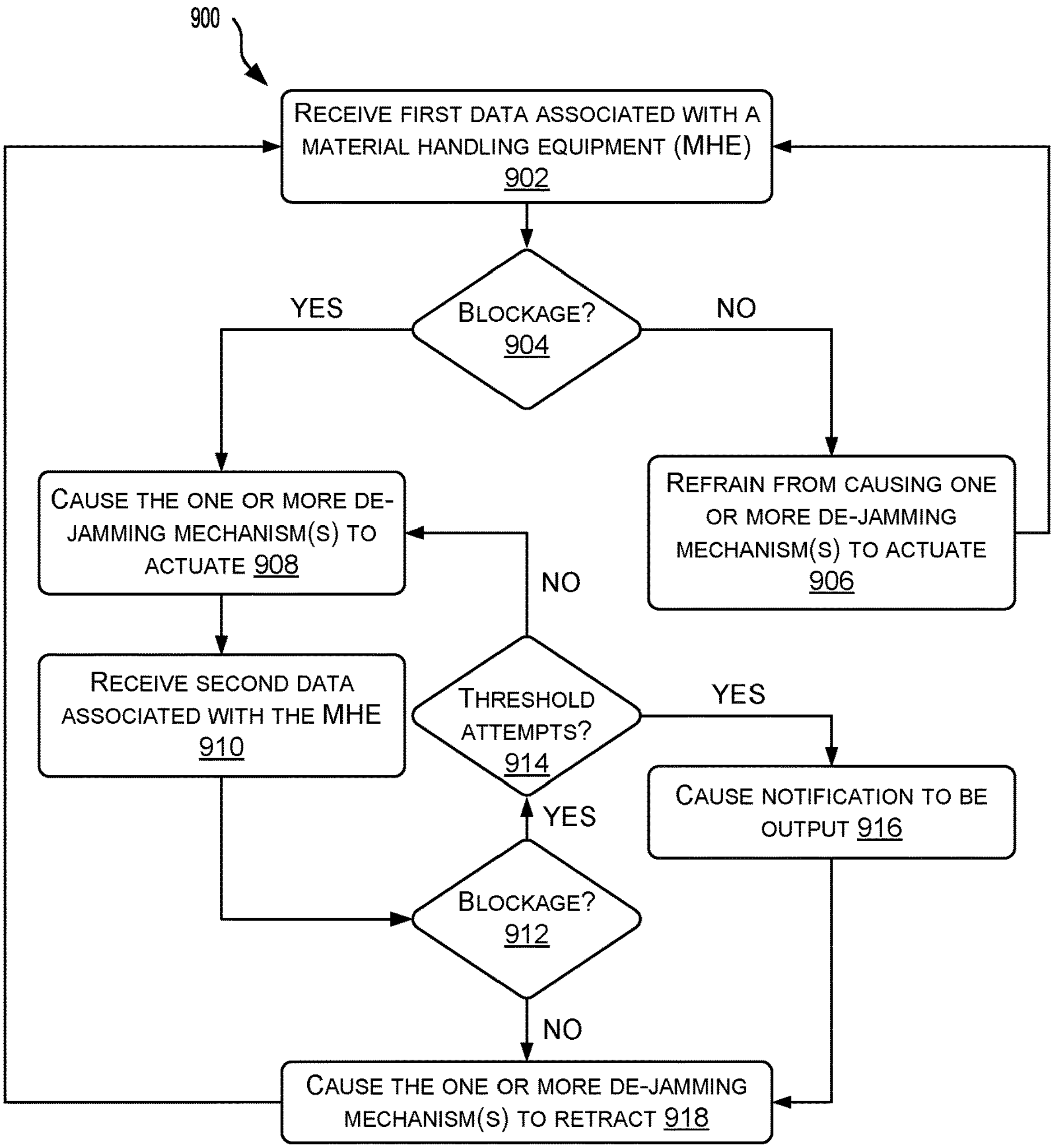
FIG. 9 illustrates an example process for controlling the de-jamming mechanism(s) of FIG. 1, according to examples of the present disclosure.

FIG. 9 illustrates a process 900 (e.g., method) related to clearing jams within a MHE, according to examples of the present disclosure. The process 900 described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process 900, or alternative processes, and not all of the blocks need be executed. For discussion purposes, the process 900 are described with reference to the environments, devices, architectures, diagrams, and systems described in the examples herein, such as, for example those described with respect to FIGS. 1-8, although the process 900 may be implemented in a wide variety of other environments, architectures, and systems.

FIG. 9 illustrates an example process 900 associated with controlling de-jamming mechanism(s), according to examples of the present disclosure. In some instances, the process 900 may be performed by the de-jamming mechanism(s) 102, the sensor(s) and/or device(s) 120, and/or the computing resource(s) 124.

At 902, the process 900 may include receive first data associated with a MHE. For example, sensor(s) and/or device(s) 120 may generate sensor data 122 associated with the MHE 104. The sensor data 122 may indicate whether a jam is present in the MHE 104. For example, the sensor data 122 may be used to determine whether the packages 300 are past a certain fill line 306 associated with the MHE 104, whether a certain number of packages 300 are in the MHE 104, and so forth.

At 904, the process 900 may include determining whether a jam is present in the MHE. For example, based at least in part on the first data received at 902, the process 900 may determine whether a jam (e.g., blockage, obstruction, etc.) is present in the MHE 104. When a jam is present, the packages 300 may not be flowing through the MHE 104 at a desired speed, may becoming stuck in the MHE 104, and so forth. If at 904 the process 900 determines that there is no jam in the MHE 104, the process 900 may follow the "NO" route and proceed to 906.

At 906, the process 900 may refrain from causing one or more de-jamming mechanism(s) to actuate. For example, because no jam was detected, and therefore, the packages 300 are flowing through the MHE 104, the de-jamming mechanism(s) 102 may not be needed to clear the jam. However, from time to time, the de-jamming mechanism(s) 102 may be actuated as a way to prevent (e.g., proactively) the jam.

Returning to 904, if the process 900 determines that the jam is present, the process 900 may follow the "YES" route and proceed to 908. At 908, the process 900 may include causing the one or more de-jamming mechanism(s) to actuate. For example, to clear the jam, the de-jamming mechanism(s) 102 may be caused to actuate such that the actuator(s) 118 extend the wedge(s) 112 into the MHE 104. As discussed above, the de-jamming mechanism(s) 102 may have a synchronous movement or an asynchronous movement. During a synchronous movement, the wedge(s) 112 may be actuated in the same direction (i.e., the actuator(s) 118 across the de-jamming mechanism(s) 102 may move the wedge(s) 112 in the same direction) to extend into and retract from the MHE 104. During an asynchronous movement, the wedge(s) 112 may be actuated in a different direction. The de-jamming mechanism(s) 102 may be controlled according to the settings.

Moreover, in some instances, a portion of or all the de-jamming mechanism(s) 102 may be used. For example, if two of the de-jamming mechanism(s) 102 are disposed along the MHE 104, only one of the de-jamming mechanism(s) 102 may be actuated. For example, based at least in part on a location of the jam or a position of the package(s) 300 in the MHE 104 (e.g., via the sensor data 122), certain de-jamming mechanism(s) 102 may be actuated. Still, in some instances, the de-jamming mechanism(s) 102 located at different locations along the length of the MHE 104 may be actuated at different times depending upon the location of the jam, the packages 300, and so forth.

At 910, the process 900 may include receiving second data associated with the MHE. For example, the sensor(s) and/or device(s) 120 may generate the sensor data 122 associated with the MHE 104. The sensor data 122 may indicate whether a jam is present in the MHE 104, whether the jam has been cleared, and so forth. For example, the sensor data 122 may be used to determine whether the packages 300 are past a certain fill line 306 associated with the MHE 104, whether a certain number of packages 300 are in the MHE 104, and so forth.

At 912, the process 900 may include determining whether a jam is present in the MHE 104. For example, similar to the determination at 904, when a jam is present, the packages 300 may not be flowing through the MHE 104 at a desired speed, may becoming stuck in the MHE 104, and so forth. If at 912 the process 900 determines that there is a jam in the MHE 104, the process 900 may follow the "YES" route and proceed to 914.

At 914, the process 914 may include determining whether the de-jamming mechanism(s) have been actuated for a threshold number of attempts. For example, if after a threshold number of attempts, the jam is still present, the de-jamming mechanism(s) 102 are unable to clear the jam, other measures may be taken. In some instances, rather than determining whether the de-jamming mechanism(s) 102 have been actuated a threshold number of attempts, the process 900 may determine whether the de-jamming mechanism(s) 102 have been actuated for a threshold period of time. If after the threshold period of time, the de-jamming mechanism(s) 102 are unable to clear the jam, the other measures may be taken. If at 914, the process 900 determines that the threshold number of attempt(s) has not been satisfied, the process 900 may loop to 908 to continuing actuating the de-jamming mechanism(s) 102 to clear the jam.

If at 914 the process 900 determines that the threshold number of attempts has been satisfied, the process 900 may follow the "YES" route and proceed to 916. At 916, the process 900 may include causing a notification to be output. For example, lighting elements, speakers, etc. may output a visual indication, audible indication, etc. The indication may be associated with requesting assistance from an associate within an environment to manually clear the environment. For example, an associate may manually manipulate the packages to clear the jam. In some instances, the notification may output at the MHE 104 (e.g., via lights, speakers, etc.) and/or the notification may be output on a device of the associate.

Following 916, the process 900 may proceed to 918. The process 900 may also proceed to 918 following the "NO" route from 912. At 918, the process 900 may include causing the one or more de-jamming mechanism(s) to retract. For example, after the jam is clear, the de-jamming mechanism(s) 102 may return to a retracted position or resting state. At the resting state, the surface 400 of the wedge(s) 112 may be flush with the surface 110 of the MHE 104 such that the wedge(s) 112 do not protrude above the surface 110 and act as a barrier to prevent packages 300 flowing through the MHE 104. The setting(s) 130 may indicate a position of the actuator 118 whereby the surface 400 is flush with the surface 110 of the MHE 104. From 918, the process 900 may loop to 902 to continue monitoring for jams in the MHE 104.

Although the process 900 is described as controlling de-jamming mechanism(s) 102 for a MHE 104, de-jamming mechanism(s) 102 may be controlled across a plurality of MHEs in an environments, or different environments. Still, although described in use with a MHE, the de-jamming mechanism(s) 102 may be located at, on, or along other conveyance mechanisms (e.g., conveyor, slide, etc.).

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a chute configured to divert packages from a first conveyor to a second conveyor, the chute including a first slot and a second slot;

one or more sensors configured to generate sensor data associated with the packages in the chute;

a first de-jamming mechanism including:

a first wedge disposed at least partially within the first slot, a first arm coupled to the first wedge, a second arm hingedly coupled to the first arm, and a first actuator disposed between the first arm and the second arm, the first actuator configured to extend the first wedge into the chute and retract the first wedge from within the chute;

one or more processors; and one or more non-transitory computer-readable media storing computer-executable instructions that, when executed by the one or more processors, cause the one or more processors to perform acts comprising:

receiving the sensor data associated with the packages in the chute, determining, based on the sensor data, that the packages are jammed within the chute, and based on the packages being jammed within the chute, causing the first actuator to extend the first wedge into the chute at a first instance in time.

2. The system of claim 1, further comprising:

a second de-jamming mechanism including:

a second wedge disposed at least partially within the second slot, and a second actuator configured to extend the second wedge into the chute and retract the second wedge from within the chute;

the acts further comprising;

based on the packages being jammed, causing the second actuator to extend the second wedge into the chute at a second instance in time that is at least partially after the first instance in time;

wherein:

actuating the first actuator in a first direction rotates the first wedge in a first rotational direction to extend the first wedge into the chute;

actuating the second actuator in the first direction rotates the second wedge in the first rotational direction to extend the second wedge into the chute;

actuating the first actuator in a second direction, opposite the first direction, rotates the first wedge in a second rotational direction, opposite the first rotational direction, to retract the first wedge from within the chute; and actuating the second actuator in the second direction rotates the second wedge in the second rotational direction to retract the second wedge from within the chute.

3. The system of claim 2, wherein the first actuator at least partially retracts the first wedge from within the chute while the second actuator at least partially extends the second wedge into the chute.

4. The system of claim 2, wherein:

the chute includes a first surface that defines the first slot and the second slot;

the first wedge includes:

a first resting state from which the first wedge extends into the chute, and a second surface that is substantially flush with the first surface in the first resting state; and the second wedge includes:

a second resting state from which the second wedge extends into the chute, and a third surface that is substantially flush with the first surface in the second resting state.

5. A system comprising:

a de-jamming mechanism including a body configured to move from a retracted state to an extended state in which the body is at least partially disposed within a material handling equipment (MHE) in which packages are processed, the de-jamming mechanism including:

a first arm coupled to the body, a second arm hingedly coupled to the first arm, and a first actuator disposed between the first arm and the second arm; and one or more processors; and one or more non-transitory computer-readable media storing computer-executable instructions that, when executed by the one or more processors, cause the one or more processors to perform acts comprising:

receiving data associated with the packages in the MHE;

causing, at a first instance in time, the body to move from the retracted state to the extended state, and causing, at a second instance in time that is at least partially after the first instance in time, the body to move from the extended state to the retracted state.

6. The system of claim 5, the acts further comprising:

adjusting, by one or more first adjustment mechanisms, at least one of a yaw, pitch, or roll of the body.

7. The system of claim 5, the acts further comprising:

receiving second data associated with the packages in the MHE; and causing, at a third instance in time that is at least partially after the second instance in time, the body to extend into the MHE.

8. The system of claim 5, the acts further comprising:

receiving an instruction associated with actuating the body from the retracted state to the extended state, the instruction being based at least in part on the packages being jammed within the MHE.

9. The system of claim 5, further comprising a second de-jamming mechanism including a second body configured to move from a second retracted state to a second extended state in which the second body is at least partially disposed within the MHE.

10. The system of claim 9, wherein:

the second de jamming mechanism includes:

a third arm coupled to the second body, a fourth arm hingedly coupled to the third arm, and a second actuator disposed between the third arm and the fourth arm.

11. The system of claim 9, the acts further comprising:

causing, at the second instance in time, the second body to move from the second retracted state to the second extended state; and causing, at a third instance in time that is at least partially after the second instance in time, the body to move from the extended state to the retracted state.

12. The system of claim 5, wherein:

the packages are configured to slide along a first surface of the MHE;

the body includes a second surface; and in the retracted state of the body, the second surface is substantially planar with the first surface.

13. The system of claim 5, wherein the body rotates from the retracted state to the extended state.

14. A method comprising:

receiving data associated with one or more packages in a material handling equipment (MHE);

causing, based at least in part on the data, an actuator of a de-jamming mechanism to actuate in a first direction such that the actuator moves a body of the de-jamming mechanism from a first position in which the body is disposed external to the MHE, to a second position in which the body is at least partially disposed within the MHE; and causing the actuator of the de-jamming mechanism to actuate in a second direction such that the actuator moves the body of the de-jamming mechanism from the second position to the first position, wherein the de-jamming mechanism includes a first arm coupled to the body, a second arm hingedly coupled to the first arm, and the actuator disposed between the first arm and the second arm.

15. The method of claim 14, wherein in the first position, a first surface of the body is substantially planar with a second surface of the MHE on which the one or more packages are disposed and slide downwards.

16. The method of claim 14, further comprising:

causing a second actuator of a second de-jamming mechanism to actuate in the first direction such that the second actuator moves a second body of the second de-jamming mechanism from a third position in which the second body is disposed external to the MHE, to a fourth position in which the second body is at least partially disposed within the MHE; and causing the second actuator of the second de-jamming mechanism to actuate in the second direction such that the second actuator moves the second body of the de-jamming mechanism from the fourth position to the third position.

17. The method of claim 16, wherein during movement of the body from the second position to the first position, the second body moves from the third position to the fourth position.

18. The method of claim 14, further comprising:

determining, based at least in part on the data, that the one or more packages are jammed within the MHE;

receiving second data associated with the one or more packages in the MHE; and determining, based at least in part on the second data, that the one or more packages are cleared from the MHE;

wherein the actuator of the de-jamming mechanism is caused to actuate such that the actuator moves the body to the first position responsive to determining that the one or more packages are cleared from the MHE.

19. The method of claim 14, wherein the body rotates between the first position and the second position.

20. The method of claim 14, wherein:

the MHE includes a surface having a slot in which the body is configured to reside; and the body extends between the first position and the second position in a direction perpendicular to the surface.

* * * * *